US010803674B2

(12) United States Patent
Kocharlakota et al.

(10) Patent No.: US 10,803,674 B2
(45) Date of Patent: Oct. 13, 2020

(54) SYSTEM AND METHOD FOR CHANGING A VIRTUAL REALITY ENVIRONMENT DYNAMICALLY

(71) Applicant: Samsung Electronics Co., Ltd., Suwon-si, Gyeonggi-do (KR)

(72) Inventors: Sridhar Kocharlakota, Fremont, CA (US); Moiz Kaizar Sonasath, Sunnyvale, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/112,274

(22) Filed: Aug. 24, 2018

(65) Prior Publication Data
US 2019/0139321 A1    May 9, 2019

Related U.S. Application Data

(60) Provisional application No. 62/581,411, filed on Nov. 3, 2017.

(51) Int. Cl.
*G06T 19/00* (2011.01)
*G06T 19/20* (2011.01)

(52) U.S. Cl.
CPC ............ *G06T 19/20* (2013.01); *G06T 19/006* (2013.01); *G06T 2200/04* (2013.01)

(58) Field of Classification Search
None
See application file for complete search history.

(56) References Cited

U.S. PATENT DOCUMENTS 9,694,235 B2    7/2017 Oh et al.
2008/0176619 A1* 7/2008 Kelly ............... A63F 3/081
463/16

(Continued)

FOREIGN PATENT DOCUMENTS

KR  10-2009-0043100 A   5/2009
KR  10-2017-0014451 A   2/2017

(Continued)

OTHER PUBLICATIONS

Reddy et al., "Development of Hall Sensor Propeller Anemometer for Measuring Wind Speed using Embedded controller", 2012 International Conference on Communications, Devices and Intelligent Systems (CODIS), Dec. 2012, pp. 484-487.

(Continued)

*Primary Examiner* — Nicholas R Wilson

(57) ABSTRACT

An electronic device is provided that has a heat mountable device (HMD) with a display, some sensors, a network interface, and a memory that are all interconnected with a processor. First context is created for a virtual reality (VR) application. The VR application includes a default virtual object and a virtual environment. Second context is obtained from the physical world. The first context and the second context are combined to create a combined context that includes physical world details with the first context. A determination is made as to whether a replacement virtual object, relevant to the combined context, is available. When a replacement virtual object is available, it can be obtained and substituted for the default virtual object in the virtual environment. The virtual environment can then be displayed with the replacement virtual object instead of the default virtual object.

20 Claims, 11 Drawing Sheets

(56) References Cited

U.S. PATENT DOCUMENTS

| | | |
|---|---|---|
| 2015/0011362 A1 | 1/2015 | Oh et al. |
| 2015/0294506 A1 | 10/2015 | Bare et al. |
| 2015/0310279 A1 | 10/2015 | Bare et al. |
| 2016/0012643 A1 | 1/2016 | Kezele et al. |
| 2016/0025982 A1 | 1/2016 | Sutherland et al. |
| 2016/0027218 A1 | 1/2016 | Salter et al. |
| 2016/0086381 A1 | 3/2016 | Jung et al. |
| 2016/0260252 A1 | 9/2016 | Kim et al. |
| 2016/0300392 A1 | 10/2016 | Jonczyk et al. |
| 2016/0379415 A1 | 12/2016 | Espeset et al. |
| 2017/0147064 A1 | 5/2017 | Yang et al. |
| 2017/0286993 A1* | 10/2017 | Khalid ............... G06Q 30/0241 |
| 2017/0287007 A1 | 10/2017 | Du |
| 2018/0033163 A1 | 2/2018 | Sugimoto |

FOREIGN PATENT DOCUMENTS

| | | |
|---|---|---|
| KR | 10-2017-0058793 A | 5/2017 |
| KR | 10-1822471 B1 | 1/2018 |
| WO | 2015135066 A1 | 9/2015 |

OTHER PUBLICATIONS

Upadhyay et al., "Experimenting with VR Ad formats at Area 120", Google Developers, Jun. 28, 2017, 3 pages. https://developers.googleblog.com/2017/06/experimenting-with-vr-ad-formats-at.html.

ISA/KR, "International Search Report and Written Opinion of the International Searching Authority," International Application No. PCT/KR2018/013259, dated Feb. 1, 2019, 8 pages.

Supplementary European Search Report in connection with European Application No. 18873754.8 dated Aug. 20, 2020, 10 pages.

* cited by examiner

SYSTEM AND METHOD FOR CHANGING A VIRTUAL REALITY ENVIRONMENT DYNAMICALLY

CROSS-REFERENCE TO RELATED APPLICATION AND CLAIM OF PRIORITY

This application claims priority under 35 U.S.C. § 119(e) to U.S. Provisional Patent Application No. 62/581,411 filed on Nov. 3, 2017. The above-identified provisional patent application is hereby incorporated by reference in its entirety.

TECHNICAL FIELD

This disclosure relates generally to virtual reality (VR) applications and VR environments. More specifically, this disclosure relates to systems and methods that dynamically change a VR environment.

BACKGROUND

Intrusive advertisements are placed in many types of media including TV, downloadable and streamable media, and mobile applications. Such intrusive advertisements are often a major source of revenue for companies associated with media content or delivery of the media content. Intrusive advertisements often include banner ads, windows that open, side panel ads, popup ads, and video ad interruptions. Such intrusive advertisements often block or are overlaid over the media that is being viewed creating an annoyance to the user.

Additionally, many types of media are limited to the merely providing a default environment. For example a game application for a basketball game may provide only default environments that have no connection to the geographical location or real world physical surroundings of the user who is playing the basketball game application. For example, the user may be sitting on a bench outside in California playing a basketball application that provides a view of a non-descript indoor basketball stadium with team green playing against team blue. The result is there is limited immersion into and connection with the game by the user with respect to the user's location and environment.

SUMMARY

This disclosure provides a system and method for dynamically changing or modifying a virtual reality environment. An embodiment of the disclosure may also provide a system and method for a framework for seamless and non-obtrusive integration of real world related virtual objects into the virtual world. In an embodiment, the framework can utilize a process that achieves the seamless integration of, for example, weather conditions, real world context, geographically related information, or advertisements into a VR environment. Embodiments provide a system and process that can achieve transitions between real and virtual worlds by including real world context in virtual world environments.

In a first embodiment, an electronic device having a display configurable for use in a head mountable device (HMD) is provided. The electronic device includes one or more sensors, a network interface and a memory. The at least one processor is coupled to the display, the memory, network interface, and the one or more sensors. The least one processor is configured to determine a first context for a virtual reality (VR) application. The VR application can provide a default virtual object in a virtual environment. The at least one processor obtains a second context based on the physical world. The at least one processor also combines the first context with the second context to create a combined context such that the combined context includes physical world details with the first context. The at least one processor determines whether a replacement virtual object is available. The replacement virtual object is a relevant virtual object that is relevant to the combined context. When the replacement virtual object is available, the at least one processor obtains the replacement virtual object and substitutes the default virtual object with the replacement virtual object in the virtual environment and then displays the virtual environment comprising the replacement virtual object on the display.

In a second embodiment, a method for dynamically changing a virtual reality (VR) is provided. The method for dynamically changing a virtual reality includes providing an electronic device configurable for use in a head mountable device (HMD). The electronic device has one or more sensors, a network interface, a memory and at least one processor. The method further includes determining a first context for a VR application; the VR application includes a default virtual object in a virtual environment. The method obtains a second context based on the physical world. The method proceeds by combining the first context with the second context to create a combined context. The combined context includes physical world details with the first context. The method then determines whether a replacement virtual object is available. The replacement virtual object may be referred to as a relevant virtual object because it is relevant to the combined context. When the replacement virtual object is available, the method obtains the replacement virtual object and substitutes the default virtual object with the replacement virtual object in the virtual environment. The method then displays the virtual environment with the replacement virtual object.

In a third embodiment, non-transitory computer readable medium that includes program code for dynamically changing a virtual reality (VR) environment that, when the program code is executed by at least one processor, the program code causes an electronic device to determine a first context for a VR application wherein the VR application includes a default virtual object in a virtual environment. The program code further causes the electronic device to obtain a second context from the physical world and combine the first context with the second context to create a combined context, wherein the combined context includes physical world details with the virtual context. Electronic device is further caused to determine whether a replacement virtual object is available. The replacement virtual object being a relevant virtual object that is relevant to the combined context. When the replacement virtual object is available, the electronic device is caused to obtain the replacement virtual object and substitute the default object with the replacement virtual object in the virtual environment and then display the virtual environment comprising the replacement virtual object. Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used herein, the terms "have," "may have," "include," "may include," "can have," or "can include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts.

For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," ""an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic accessory, an electronic tattoo, a smart mirror, or a smart watch).

Definitions for other certain words and phrases are provided throughout this patent document. Those of ordinary skill in the art should understand that in many if not most instances, such definitions apply to prior as well as future uses of such defined words and phrases.

According to embodiments of the present disclosure, the electronic device can be a smart home appliance. Examples of the smart home appliance can include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HOMESYNC™, APPLE TV™, or GOOGLE TV™), a gaming console (XBOX™, PLAYSTATION™), an electronic dictionary, an electronic key, a camcorder, or an electronic picture frame.

According to an embodiment of the present disclosure, examples of the electronic device can include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to certain embodiments of the disclosure, the electronic device can be at least one of a part of a piece of furniture or building/structure, an electronic board, an electronic signature receiving device, a projector, or various measurement devices (e.g., devices for measuring water, electricity, gas, or electromagnetic waves).

According to embodiments of the present disclosure, the electronic device is one or a combination of the above-listed devices. According to embodiments of the present disclosure, the electronic device is a flexible electronic device. The electronic device disclosed herein is not limited to the above-listed devices, and can include new electronic devices depending on the development of technology.

As used herein, the term "user" may denote a human or another device (e.g., an artificial intelligent electronic device) using the electronic device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 10D, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
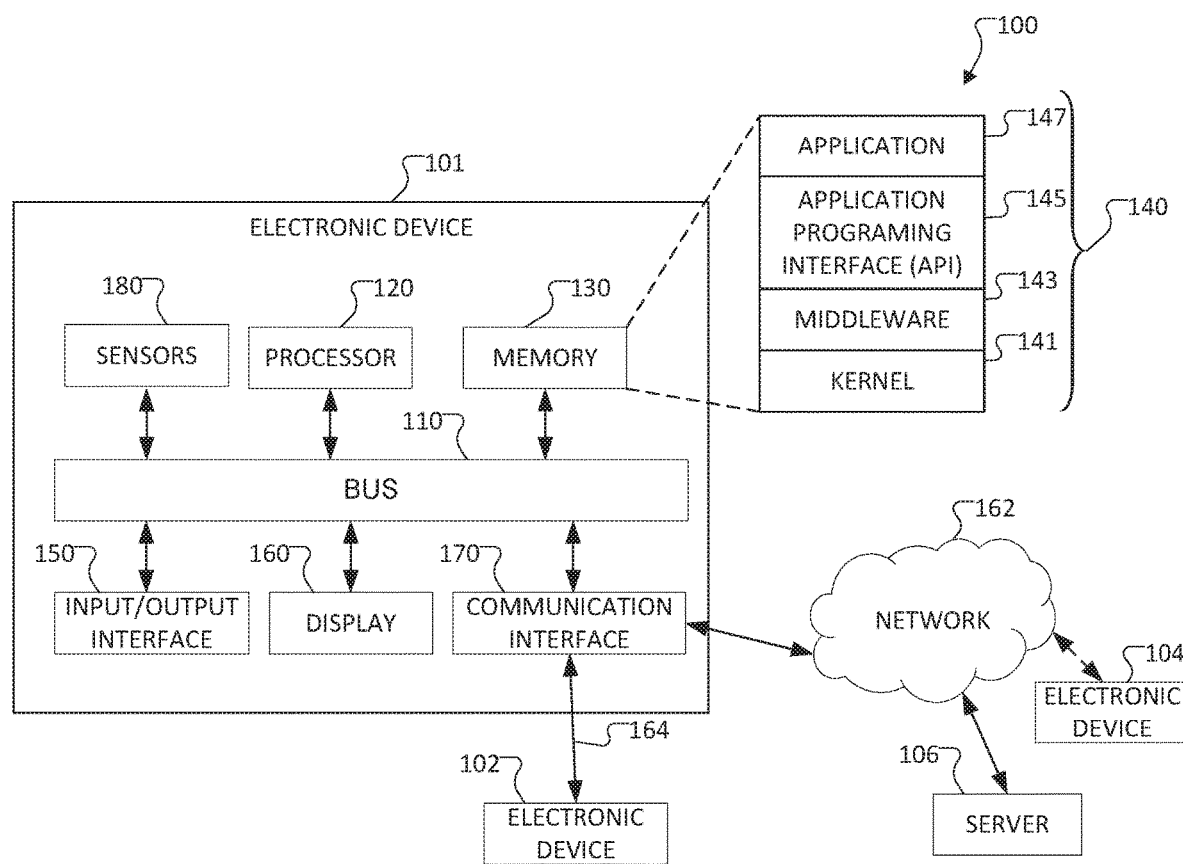
FIG. 1 illustrates an example network configuration according to embodiments of the present disclosure.

FIG. 1 illustrates an example network configuration 100 according to various embodiments of the present disclosure. The embodiment of the network configuration 100 shown in FIG. 1 is for illustration only. Other embodiments of the network configuration 100 could be used without departing from the scope of this disclosure.

According to an embodiment of the present disclosure, an electronic device 101 is included in a network environment 100. The electronic device 101 can include at least one of a bus 110, a processor 120, a memory 130, an input/output (IO) interface 150, a display 160, a communication interface 170, or sensors 180. In some embodiments, the electronic device 101 can exclude at least one of the components or can add another component.

The bus 110 includes a circuit for connecting the components 120 to 170 with one another and transferring communications (e.g., control messages and/or data) between the components.

The processor 120 includes one or more of a central processing unit (CPU), an application processor (AP), or a communication processor (CP). The processor 120 is able to perform control on at least one of the other components of the electronic device 101, and/or perform an operation or data processing relating to communication.

For example, the processor 120 can receive a plurality of frames captured by the camera during a capture event. The processor 120 can identify a salient region in each of the plurality of frames. The processor 120 can determine a reference frame from the plurality of frames based on the identified salient regions. The processor 120 can fuse non-reference frames with the determined reference frame into a completed frame. The processor 120 can operate the display to display the completed frame.

The memory 130 can include a volatile and/or non-volatile memory. For example, the memory 130 can store commands or data related to at least one other component of the electronic device 101. According to an embodiment of the present disclosure, the memory 130 can store software and/or a program 140. The program 140 includes, e.g., a kernel 141, middleware 143, an application programming interface (API) 145, and/or an application program (or "application") 147. At least a portion of the kernel 141, middleware 143, or API 145 can be denoted an operating system (OS).

For example, the kernel 141 can control or manage system resources (e.g., the bus 110, processor 120, or a memory 130) used to perform operations or functions implemented in other programs (e.g., the middleware 143, API 145, or application program 147). The kernel 141 provides an interface that allows the middleware 143, the API 145, or the application 147 to access the individual components of the electronic device 101 to control or manage the system resources.

The middleware 143 can function as a relay to allow the API 145 or the application 147 to communicate data with the kernel 141, for example. A plurality of applications 147 can be provided. The middleware 143 is able to control work requests received from the applications 147, e.g., by allocating the priority of using the system resources of the electronic device 101 (e.g., the bus 110, the processor 120, or the memory 130) to at least one of the plurality of applications 134.

The API 145 is an interface allowing the application 147 to control functions provided from the kernel 141 or the middleware 143. For example, the API 145 includes at least one interface or function (e.g., a command) for filing control, window control, image processing or text control.

The IO interface 150 serve as an interface that can, e.g., transfer commands or data input from a user or other external devices to other component(s) of the electronic device 101. Further, the IO interface 150 can output commands or data received from other component(s) of the electronic device 101 to the user or the other external device. In certain embodiments, the IO interface 150 can include an intelligent assistant, such as BIXBY or GOOGLE ASSISTANT, CORTANA, ECHO, VIV, or the like.

The display 160 includes, e.g., a liquid crystal display (LCD), a light emitting diode (LED) display, an organic light emitting diode (OLED) display, or a microelectromechanical systems (MEMS) display, or an electronic paper display. The display 160 is able to display, e.g., various contents (e.g., text, images, videos, icons, or symbols) to the user. The display 160 can include a touchscreen and may receive, e.g., a touch, gesture, proximity or hovering input using an electronic pen or a body portion of the user.

For example, the communication interface 170 is able to set up communication between the electronic device 101 and an external electronic device (e.g., a first electronic device 102, a second electronic device 104, or a server 106). For example, the communication interface 170 can be connected with the network 162 or 164 through wireless or wired communication to communicate with the external electronic device. The communication interface 170 can be a wired or wireless transceiver or any other component for transmitting and receiving signals, such as video feeds or video streams.

Electronic device 101 further includes one or more sensors 180 that can meter a physical quantity or detect an activation state of the electronic device 101 and convert metered or detected information into an electrical signal. For example, sensor 180 can include one or more buttons for touch input, a camera, a gesture sensor, a gyroscope or gyro sensor, an air pressure sensor, a magnetic sensor or magnetometer, an acceleration sensor or accelerometer, a grip sensor, a proximity sensor, a color sensor (e.g., a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an IR sensor, an ultrasound sensor, an iris sensor, a fingerprint sensor, etc. The sensor(s) 180 can further include a control circuit for controlling at least one of the sensors included therein. Any of these sensor(s) 180 can be located within the electronic device 101. A camera sensor 180 can capture a plurality of frames for a single image to be combined by the processor 120.

The first external electronic device 102 or the second external electronic device 104 can be a wearable device or an electronic device 101-mountable wearable device (e.g., a head mounted display (HMD)). When the electronic device 101 is mounted in a HMD (e.g., the electronic device 102), the electronic device 101 is able to detect the mounting in the HMD and operate in a virtual reality mode. When the electronic device 101 is mounted in the electronic device 102 (e.g., the HMD), the electronic device 101 can communicate with the electronic device 102 through the communication interface 170. The electronic device 101 can be directly connected with the electronic device 102 to communicate with the electronic device 102 without involving with a separate network.

The wireless communication is able to use at least one of, e.g., long term evolution (LTE), long term evolution-advanced (LTE-A), 5th generation wireless system (5G), mm-wave or 60 GHz wireless communication, Wireless USB, code division multiple access (CDMA), wideband code division multiple access (WCDMA), universal mobile telecommunication system (UMTS), wireless broadband (Wi-Bro), or global system for mobile communication (GSM), as a cellular communication protocol. The wired connection can include at least one of universal serial bus (USB), high definition multimedia interface (HDMI), recommended standard 232 (RS-232), or plain old telephone service (POTS).

The network 162 includes at least one of communication networks, e.g., a computer network (e.g., local area network (LAN) or wide area network (WAN)), Internet, or a telephone network.

The first and second external electronic devices 102 and 104 and server 106 each can be a device of the same or a different type from the electronic device 101. According to certain embodiments of the present disclosure, the server 106 includes a group of one or more servers. According to certain embodiments of the present disclosure, all or some of operations executed on the electronic device 101 can be executed on another or multiple other electronic devices (e.g., the electronic devices 102 and 104 or server 106). According to certain embodiments of the present disclosure, when the electronic device 101 should perform some function or service automatically or at a request, the electronic device 101, instead of executing the function or service on its own or additionally, can request another device (e.g., electronic devices 102 and 104 or server 106) to perform at least some functions associated therewith. The other electronic device (e.g., electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique can be used, for example.

Although FIG. 1 shows that the electronic device 101 includes the communication interface 170 to communicate with the external electronic device 104 or server 106 via the network 162, the electronic device 101 can be independently operated without a separate communication function, according to an embodiment of the present disclosure.

The server 106 can support to drive the electronic device 101 by performing at least one of operations (or functions) implemented on the electronic device 101. For example, the server 106 can include a processing module or processor that may support the processor 120 implemented in the electronic device 101.

Figure 2:
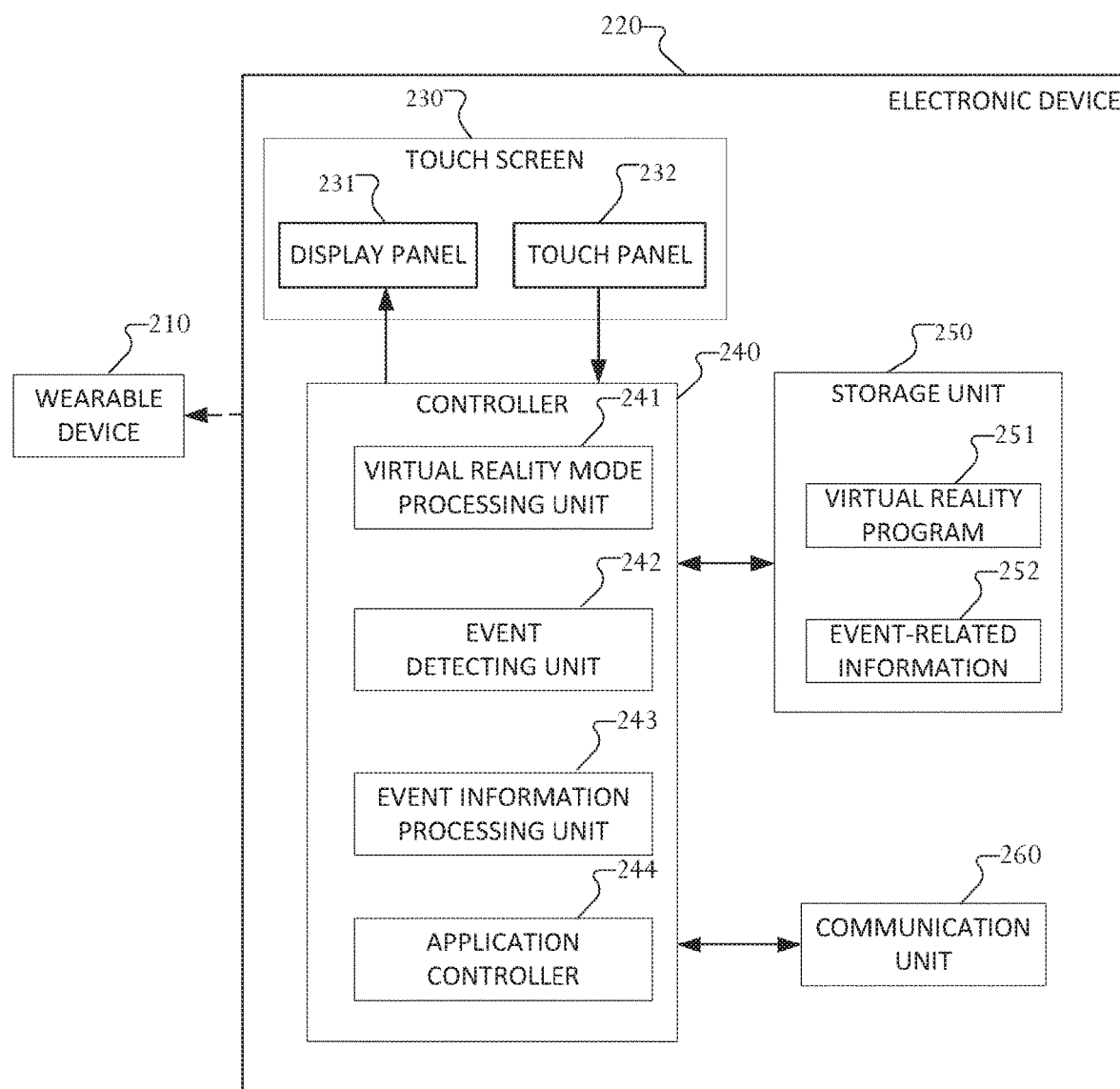
FIG. 2; illustrates an example block diagram a configuration of an electronic device according to an embodiment of the present disclosure.

FIG. 2 illustrates an example electronic device 220 according to various embodiments of the present disclosure. The embodiment of the electronic device 220 shown in FIG. 2 is for illustration only. Other embodiments of the electronic device 220 could be used without departing from the scope of this disclosure.

FIG. 2 is a block diagram illustrating an example configuration of an electronic device according to an embodiment of the present disclosure. Referring to FIG. 2, the electronic device 220 according to an embodiment of the present disclosure can be an electronic device 220 having at least one display. In the following description, the electronic device 220 can be a device primarily performing a display function or can denote a normal electronic device including at least one display. For example, the electronic device 220 can be an electronic device (e.g., a smartphone) having a touchscreen 230.

According to an embodiment of the present disclosure, the electronic device 220 can include at least one of a touchscreen 230, a controller 240, a storage unit 250, or a communication unit 260. The touchscreen 230 can include a display panel 231 and/or a touch panel 232. The controller 240 can include at least one of a virtual reality mode processing unit 241, an event determining unit 242, an event information processing unit 243, or an application controller 244.

For example, when the electronic device 220 is mounted in a wearable device 210, the electronic device 220 can operate, e.g., as an HMD, and run a virtual reality mode. Further, according to an embodiment of the present disclosure, even when the electronic device 220 is not mounted in the wearable device 210, the electronic device 220 can run the virtual reality mode according to the user's settings or run a virtual reality mode related application. In the following embodiment, although the electronic device 220 is set to be mounted in the wearable device 210 to run the virtual reality mode, embodiments of the present disclosure are not limited thereto.

According to an embodiment of the present disclosure, when the electronic device 220 operates in the virtual reality mode (e.g., the electronic device 220 is mounted in the wearable device 210 to operate in a head mounted theater (HMT) mode), two screens corresponding to the user's eyes (left and right eye) can be displayed through the display panel 231.

According to an embodiment of the present disclosure, when the electronic device 220 is operated in the virtual reality mode, the controller 240 can control the processing of information related to an event generated while operating in the virtual reality mode to fit in the virtual reality mode and display the processed information. According to an embodiment of the present disclosure, when the event generated while operating in the virtual reality mode is an event related to running an application, the controller 240 can block the running of the application or process the application to operate as a background process or application.

More specifically, according to an embodiment of the present disclosure, the controller 240 can include at least one of a virtual reality mode processing unit 241, an event determining unit 242, an event information processing unit 243, or an application controller 244 to perform functions according to various embodiments of the present disclosure. An embodiment of the present disclosure can be implemented to perform various operations or functions as described below using at least one component of the electronic device 220 (e.g., the touchscreen 230, controller 240, or storage unit 250).

According to an embodiment of the present disclosure, when the electronic device 220 is mounted in the wearable device 210 or the virtual reality mode is run according to the user's setting or as a virtual reality mode-related application runs, the virtual reality mode processing unit 241 can process various functions related to the operation of the virtual reality mode. The virtual reality mode processing unit 241 can load at least one virtual reality program 251 stored in the storage unit 250 to perform various functions.

The event detecting unit 242 determines or detects that an event is generated while operated in the virtual reality mode by the virtual reality mode processing unit 241. Further, the event detecting unit 242 can determine whether there is information to be displayed on the display screen in relation with an event generated while operating in the virtual reality mode. Further, the event detecting unit 242 can determine that an application is to be run in relation with an event generated while operating in the virtual reality mode. Various embodiments of an application related to the type of event are described below.

The event information processing unit 243 can process the event-related information to be displayed on the display screen to fit the virtual reality mode when there is information to be displayed in relation with an event occurring while operating in the virtual reality mode depending on the result of determination by the event detecting unit 242. Various methods for processing the event-related information can apply. For example, when a three-dimensional (3D) image is implemented in the virtual reality mode, the electronic device 220 converts the event-related information to fit the 3D image. For example, event-related information being displayed in two dimensions (2D) can be converted into left and right eye information corresponding to the 3D image, and the converted information can then be synthesized and displayed on the display screen of the virtual reality mode being currently run.

When it is determined by the event detecting unit 242 that there is an application to be run in relation with the event occurring while operating in the virtual reality mode, the application controller 244 performs control to block the running of the application related to the event. According to an embodiment of the present disclosure, when it is determined by the event detecting unit 242 that there is an application to be run in relation with the event occurring while operating in the virtual reality mode, the application controller 244 can perform control so that the application is run in the background so as not to influence the running or screen display of the application corresponding to the virtual reality mode when the event-related application runs.

The storage unit 250 can store a virtual reality program 251. The virtual reality program 251 can be an application related to the virtual reality mode operation of the electronic device 220. The storage unit 250 can also store the event-related information 252. The event detecting unit 242 can reference the event-related information 252 stored in the storage unit 250 in order to determine whether the occurring event is to be displayed on the screen or to identify information on the application to be run in relation with the occurring event.

The wearable device 210 can be an electronic device including at least one function of the electronic device 101 shown in FIG. 1, and the wearable device 210 can be a wearable stand to which the electronic device 220 can be mounted. In case the wearable device 210 is an electronic device, when the electronic device 220 is mounted on the wearable device 210, various functions can be provided through the communication unit 260 of the electronic device 220. For example, when the electronic device 220 is mounted on the wearable device 210, the electronic device 220 can detect whether to be mounted on the wearable device 210 for communication with the wearable device 210 and can determine whether to operate in the virtual reality mode (or an HMT mode).

According to an embodiment of the present disclosure, upon failure to automatically determine whether the electronic device 220 is mounted when the communication unit 220 is mounted on the wearable device 210, the user can apply various embodiments of the present disclosure by running the virtual reality program 251 or selecting the virtual reality mode (or, the HMT mode). According to an embodiment of the present disclosure, when the wearable device 210 functions with or as part the electronic device 101, the wearable device can be implemented to automatically determine whether the electronic device 220 is mounted on the wearable device 210 and enable the running mode of the electronic device 220 to automatically switch to the virtual reality mode (or the HMT mode).

At least some functions of the controller 240 shown in FIG. 2 can be included in an event processing module or processor 120 of the electronic device 101 shown in FIG. 1. The touchscreen 230 or display panel 231 shown in FIG. 2 can correspond to the display 160 of FIG. 1. The storage unit 250 shown in FIG. 2 can correspond to the memory 130 of FIG. 1.

Although in FIG. 2 the touchscreen 230 includes the display panel 231 and the touch panel 232, according to an embodiment of the present disclosure, the display panel 231 or the touch panel 232 may also be provided as a separate panel rather than being combined in a single touchscreen 230. Further, according to an embodiment of the present disclosure, the electronic device 220 can include the display panel 231, but exclude the touch panel 232.

According to an embodiment of the present disclosure, the electronic device 220 can be denoted as a first device (or a first electronic device), and the wearable device 210 may be denoted as a second device (or a second electronic device) for ease of description.

According to an embodiment of the present disclosure, an electronic device can comprise a display unit displaying on a screen corresponding to a virtual reality mode and a controller performing control that detects an interrupt according to an occurrence of at least one event, that varies event-related information related to the event in a form corresponding to the virtual reality mode, and that displays the varied event-related information on the display screen that corresponds to the virtual reality mode.

According to an embodiment of the present disclosure, the event can include any one or more selected from among a call reception event, a message reception event, an alarm notification, a scheduler notification, a wireless fidelity (Wi-Fi) connection, a WiFi disconnection, a low battery notification, a data permission or use restriction notification, a no application response notification, or an abnormal application termination notification.

According to an embodiment of the present disclosure, the electronic device further comprises a storage unit configured for storing the event-related information when the event is not an event to be displayed in the virtual reality mode, wherein the controller can perform control to display the event-related information stored in the storage unit when the electronic device switches from the virtual reality mode into a see-through mode.

According to an embodiment of the present disclosure, the electronic device can further comprise a storage unit that stores information regarding at least one event to be displayed in the virtual reality mode.

According to an embodiment of the present disclosure, the event can include an instant message reception notification event.

According to an embodiment of the present disclosure, when the event is an event related to running at least one application, the controller can perform control that blocks running of the application according to occurrence of the event.

According to an embodiment of the present disclosure, the controller can perform control to run the blocked application when a screen mode of the electronic device switches from the virtual reality mode into a see-through mode.

According to an embodiment of the present disclosure, when the event is an event related to running at least one application, the controller can perform control that enables the application, according to the occurrence of the event, to be run on a background of a screen of the virtual reality mode.

According to an embodiment of the present disclosure, when the electronic device is connected with a wearable device, the controller can perform control to run the virtual reality mode.

According to an embodiment of the present disclosure, the controller can enable the event-related information to be arranged and processed to be displayed in a three dimensional (3D) space of the virtual reality mode screen being displayed on a current display screen.

According to an embodiment of the present disclosure, the electronic device can include additional sensors such as one or more red, green, blue (RGB) cameras, dynamic vision sensor (DVS) cameras, 360 degree cameras, or a combination thereof.

Figure 3:
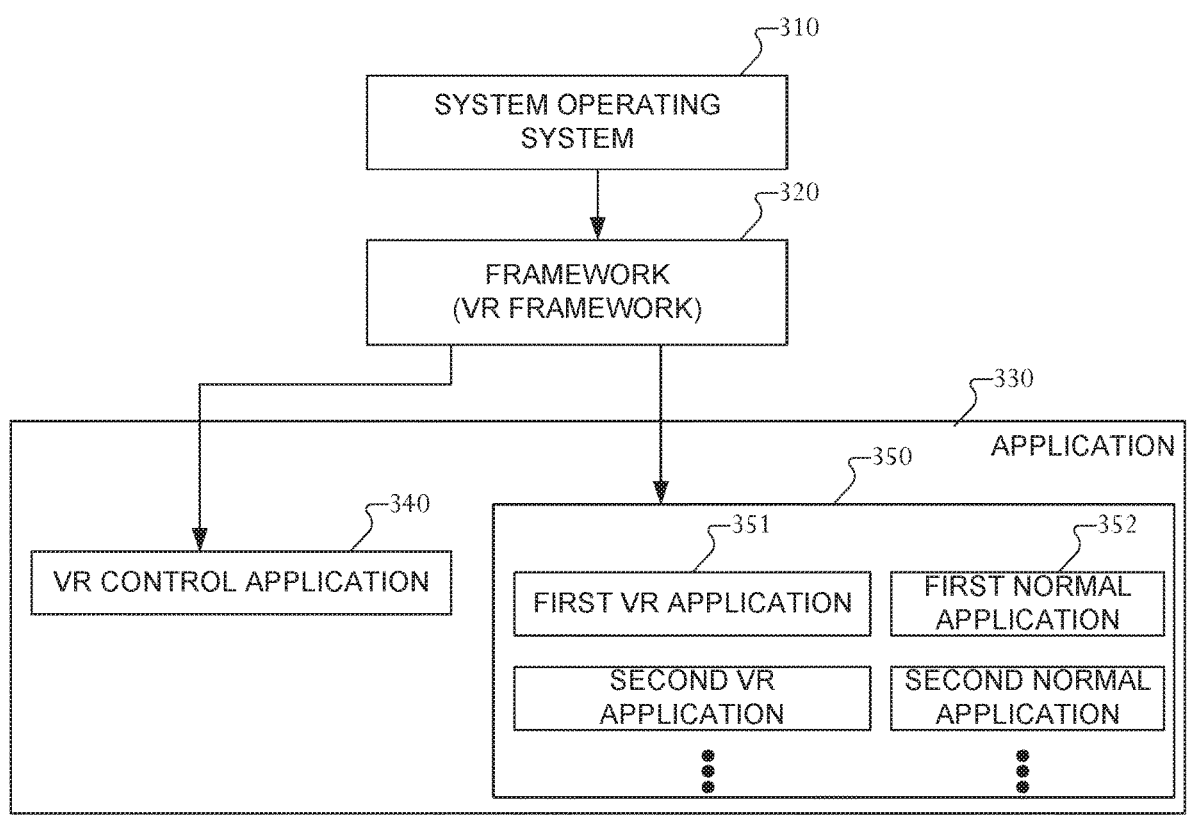
FIG. 3 illustrates an example block diagram of a program module according to embodiments of the present disclosure.

FIG. 3 is a block diagram illustrating a program module according to an embodiment of the present disclosure. The embodiment of the program module shown in FIG. 3 is for illustration only. Other embodiments could be used without departing from the scope of this disclosure. Referring to FIG. 3, the program module can include a system operating system (e.g., an OS) 310, a framework 320, and an application 330.

The system operating system 310 can include at least one system resource manager or at least one device driver. The system resource manager can perform, for example, control, allocation, or recovery of the system resources. The system resource manager may include at least one manager, such as a process manager, a memory manager, or a file system manager. The device driver may include at least one driver, such as, for example, a display driver, a camera driver, a Bluetooth driver, a shared memory driver, a USB driver, a keypad driver, a Wi-Fi driver, an audio driver, or an inter-process communication (IPC) driver.

According to an embodiment of the present disclosure, the framework 320 (e.g., middleware) can provide, for example, functions commonly required by an application or provide the application with various functions through an application programming interface (API) to allow the application to efficiently use limited system resources inside the electronic device.

The VR framework included in the framework 320 can control functions related to virtual reality mode operations on the electronic device. For example, when running a virtual reality mode operation, the VR framework 320 can control at least one VR application 351, which is related to virtual reality, among applications 330 so as to provide the virtual reality mode on the electronic device.

The application 330 can include a plurality of applications and can include at least one VR application 351 running in the virtual reality mode and at least one normal application 352 running in a normal mode, which is not the virtual reality mode.

The application 330 can further include a VR control application 340. An operation of the at least one VR application 351 and/or at least one normal application 352 can be controlled under the control of the VR control application 340.

When at least one event occurs while the electronic device operates in the virtual reality mode, the system operating system 310 can notify the framework 320, for example the VR framework, of an occurrence of an event.

The framework 320 can then control the running of the normal application 352 so that event-related information can be displayed on the screen for the event occurring in the normal mode, but not in the virtual reality mode. When there is an application to be run in relation with the event occurring in the normal mode, the framework 320 can perform or provide control to run at least one normal application 352.

According to an embodiment of the present disclosure, when an event occurs while operating in the virtual reality mode, the framework 320, for example the VR framework, can block the operation of at least one normal application 352 to display the information related to the occurring event. The framework 320 can provide the event occurring, while operating in the virtual reality mode, to the VR control application 340.

The VR control application 340 can process the information related to the event occurring while operating in the virtual reality mode to fit within the operation of the virtual reality mode. For example, a 2D, planar event-related information can be processed into 3D information.

The VR control application 340 can control at least one VR application 351 currently running and can perform control to synthesize the processed event-related information for display on the screen being run by the VR application 351 and display the result of the event related information thereon.

According to an embodiment of the present disclosure, when an event occurs while operating in the virtual reality mode, the framework 320 can perform control to block the running of at least one normal application 352 related to the occurring event.

According to an embodiment of the present disclosure, when an event occurs while operating in the virtual reality mode, the framework 320 can perform control to temporarily block the running of at least one normal application 352 related to the occurring event, and then when the virtual reality mode terminates, the framework 320 can perform control to run the blocked normal application 352.

According to an embodiment of the present disclosure, when an event occurs while operating in the virtual reality mode, the framework 320 can control the running of at least one normal application 352 related to the occurring event so that the at least one normal application 352 related to the event operates on the background so as not to influence the screen by the VR application 351 currently running.

Embodiments described in connection with FIG. 3 are examples for implementing an embodiment of the present disclosure in the form of a program, and embodiments of the present disclosure are not limited thereto and rather can be implemented in other various forms. Further, while the embodiment described in connection with FIG. 3 references VR, it can be applied to other scenarios such as augmented reality, mixed reality, etc. Collectively the various reality scenarios can be referenced herein as cross reality (XR).

According to embodiments of this disclosure, immersion of a user can be improved by dynamically changing the VR environment in order to bridge the gap between the virtual world and the real or physical world. Dynamically changing the VR environment can be assisted in part by fusion context. Fusion context is a mix of a user's virtual context within in a VR environment in conjunction with real or physical world physical context associated with the user and the environment about the user or, for example, the electronic device 220 or wearable device 210 in the physical world.

Virtual context is the virtual contextual information that prescribes the context of the environment in a virtual world of a VR application. Thus, virtual context includes circumstances that form the setting for events in the VR world provided or established by the VR application for the user to experience. Types of virtual context that form, for example, an initial setting in a VR world can include, but are not limited to, the location of the user in the virtual world, the activity that the user can do in the virtual world, and, interests associated with general types of interests that a user may have who use the VR world.

A few examples of location, activity and interest related virtual context that can be provided by a VR application about the VR experience of the VR application are presented below:

Example 1

If a user of a VR system is touring the Great Wall of China using VR application, then the virtual context for the VR application can include:
  i. Location: the virtual location is in China; And more specifically, the virtual location is the Great Wall of China;
  ii. Activity: the virtual activity of a user who uses this VR application can be touring, walking, or hiking;
  iii. Interest: the interests of a user who uses this VR application can be tourism, historic locations and/or Chinese history.

Example 2

If the user of the VR system is playing a VR bowling application or game, then the virtual context for the VR application can include:
  i. Location: the virtual location is in a bowling alley, perhaps positioned at a bowling lane in the bowling alley;
  ii. Activity: the virtual activity of a user who uses this VR application is playing bowling;
  iii. Interest: the interests of a user who uses this VR application can be games and/or entertainment.

Example 3

If the user of a VR system is viewing a VR tour application that provides a VR tour of the Smithsonian National Air and Space Museum, then the virtual context for the VR tour application can include:
  i. Location: the virtual location is Washington D.C. USA, National Air and Space Museum;
  ii. Activity: the virtual activity of a user who uses this VR application is touring, walking;
  iii. Interest: interests of the user who uses this VR application can be tourism, museums, and/or technology and science history.

Example 4

If the user is viewing a movie in a VR environment, then the virtual context for the VR movie application can be:
  i. Location: the virtual location context may not be defined;
  ii. Activity: the virtual activity of the user who uses this VR application is viewing a movie;
  iii. Interest: interests of the user who uses this VR application can be entertainment and/or movies.

Real or physical context is actual physical or real world contextual information associated with the user of the VR application. Thus, real context can include the physical or real world circumstances associated with or that are surrounding the user at the time the user is using the electronic device. Types of real context that can be utilized in embodiments to dynamically change the VR environment of a VR application from only using default virtual context provided by the VR application can include, but are not limited to, the geographical location of the user, environmental aspects of the geographical location of the user, activities that the user has recently done in the physical world and, interests that the user has or does in the physical world.

For example, a real context location for a user can be that the user is located inside his home in Mountain View, Calif. Alternatively, the real context location may be at any geographically determined location such as outside at a beach, a park, campground, pool side, or inside in a home, restaurant, stadium, school, car, train, or gym, just to name a few potential real context locations.

Real context activities of the user can include a vast variety of activities such as sports activities, including running, bowling, hiking, basketball, baseball, hockey, or bicycling just to name a few. Real context activities can include what the user is doing while using an embodiment of the disclosure, such as sitting, standing, laying down, being a passenger in a moving vehicle, vacationing, just to provide a few examples. Additionally in various embodiments, real context activities can include activities that the user has done recently or in the past, such as, but not limited to bowling, bicycling, hang gliding, surfing, swimming, mountain climbing, hiking, cooking, repairing a car, racing, hunting, watching a live sporting event, visiting a museum or monument, or cooking just to name a few.

Real context interests are actual interests of the user. Real context interests are physical or mental things that the user likes to do. Real context interests can include, without limitation, watching movies, plays or live events in the form of entertainment, play a sport, read books, hunt for animals, exercise, cook, tour museums or monuments, hiking, play video games, solve puzzles, fly radio controlled aircraft, ride horses, race motorcycles, learn history, foreign languages, science, math, medical procedures or substantially any other interest a person may have.

Figure 4:
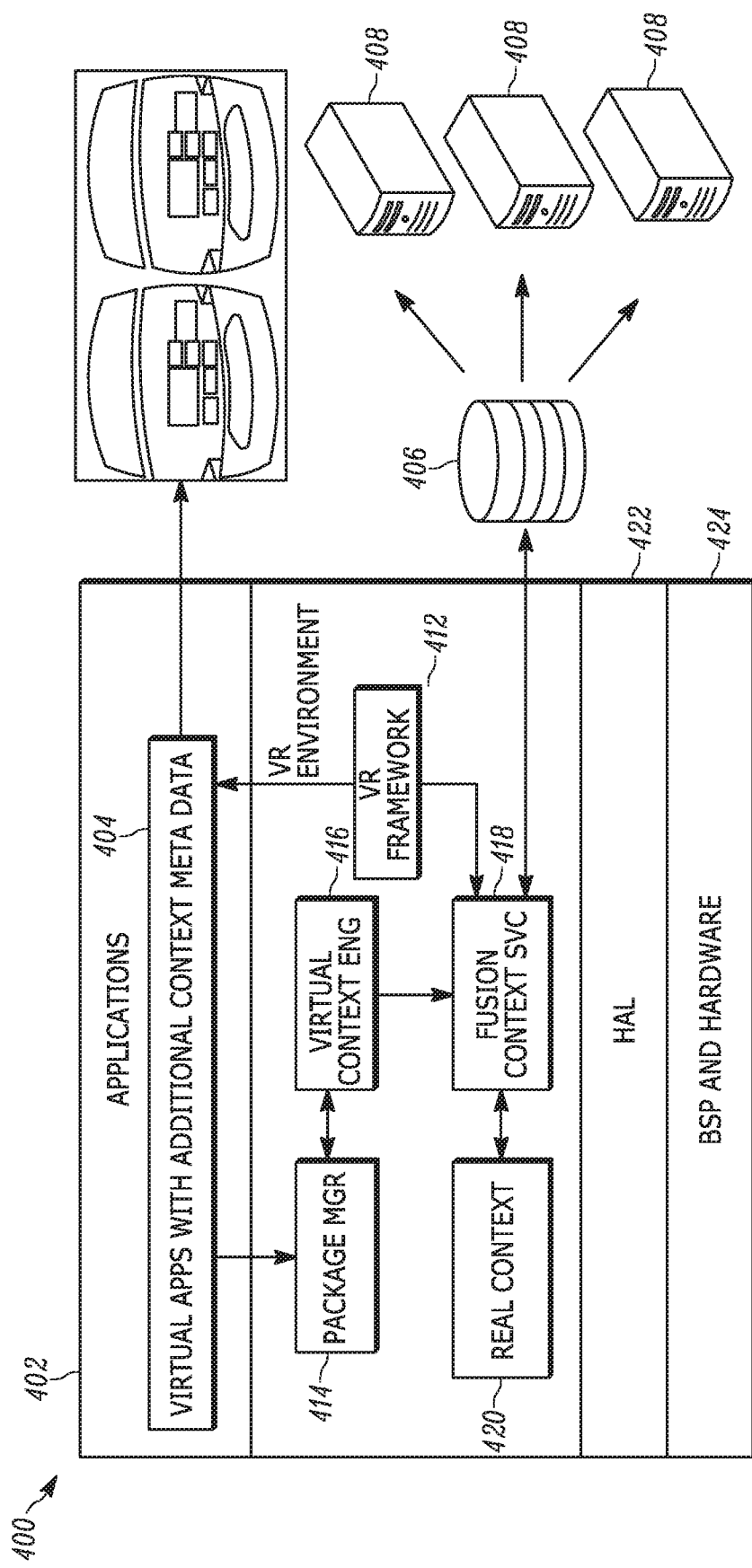
FIG. 4 illustrates an example architecture for the platform of an embodiment of the present disclosure.

FIG. 4 illustrates an example of the architecture for a platform of an embodiment of the present disclosure. The embodiment of the platform and of an embodiment is for illustration only. Other embodiments could be used without departing from the scope of this disclosure.

In FIG. 4, the architecture 400 can include an application layer 402 where access to VR applications 404 and other applications used by an electronic device are located. The VR applications 404 may be applications that include virtual context metadata. The VR applications 404 can also be VR applications that acquired or are associated with virtual context provided from data sources. Such data sources can include an external VR server 406 or third party web servers 408.

The framework 410 includes a VR framework environment 412. The VR framework environment 412 can be any framework or rendering machine for VR applications. Non-limiting examples of a VR framework could be the Gear VR Framework, VR framework like Google Daydream VR framework, Open Source VR framework like OpenXR framework a unity sample framework such as OCULUS unity sample framework, A-Frame framework, WebVR application framework, and the like. The example framework 410 has a package manager 414. The package manager 414 can include a collection of software tools that automate the process of installing, upgrading, configuring and removing programs or applications utilized by the electronic device's operating system. In various embodiments, the package manager 414 handles packages or distributions of data, software or applications that contain metadata, which can include the application's name, description of the application's purpose, version, as well as virtual context metadata. The package manager 414 can provide virtual context related metadata to the virtual context engine 416. The virtual context engine 416 extracts virtual context information found in the metadata. The virtual context engine 416 provides virtual context associated with selected or active VR application to the fusion context service module 418.

The framework 410 can also include a real context engine 420, which uses existing technologies to create and organize real context associated with the user of the electronic device or about the location or environment about the electronic device, such as electronic device(s) 101 and/or 102. Such existing technologies can be used to obtain real context can include a global positioning system (GPS) module, a temperature sensor, a humidity sensor, a network connection for receiving location data, altitude sensor, blood pressure sensor, biometric sensors, inertial measurement unit (IMU) sensors, acceleration sensors, weather sensors, or any other known sensor or data connection that can or may be used to determine real world parameters or preferences of, about or associated with the user of a VR system. The real context engine 420 provides the collected or stored real context data or information to the fusion context service module 418.

In various embodiments the fusion context service can also receive virtual context related to a VR application stored, being used by or that is running in a VR system via a network to connection the VR server 406. The VR server 406 can store and maintain contextual information for VR applications. The VR server 406 can also query and receive virtual content from one or more third party web servers 408. The third party web servers 408 may be associated with the company or creator of the particular VR application stored on or running on the electronic device. The third party Web servers 408 can also be associated with VR content providers.

The architecture 400 may also include a hardware abstraction layer (HAL) 422 configured to enable the electronic device operating system, framework or architecture to interact with hardware electronics of the electronic device or VR system.

Additionally, the architecture 400 can include a board support package (BSP) and related hardware 424, which provides interfaces between the hardware and the operating system, framework and architecture.

The architecture 400 can allow the fusion context service module 418 to operate in conjunction with the VR environment framework 412 to create and achieve dynamic changes in the VR environment as viewed by the user so as to replace virtual context related objects, graphics and media in the VR environment with real context related objects, graphics and media. The fusion context service 418 is used to provide a smart mix of the virtual context within the VR environment such in conjunction with real world physical context associated with the user and the environment about or near the user. The innovative fusion context service module 418 is utilized to establish a more immersive experience for the user into the VR environment by dynamically changing the VR environment in a manner relevant to the user's real environment, interests and life experiences. The fusion context service module can also provide the VR application and architecture platform 400 with a technique for seamless and non-obtrusive integration of marketing and advertisement placement in VR application environments. Additionally, the fusion context service module can allow for smart, user related transitions between real and virtual world environments and experiences.

Figure 5:
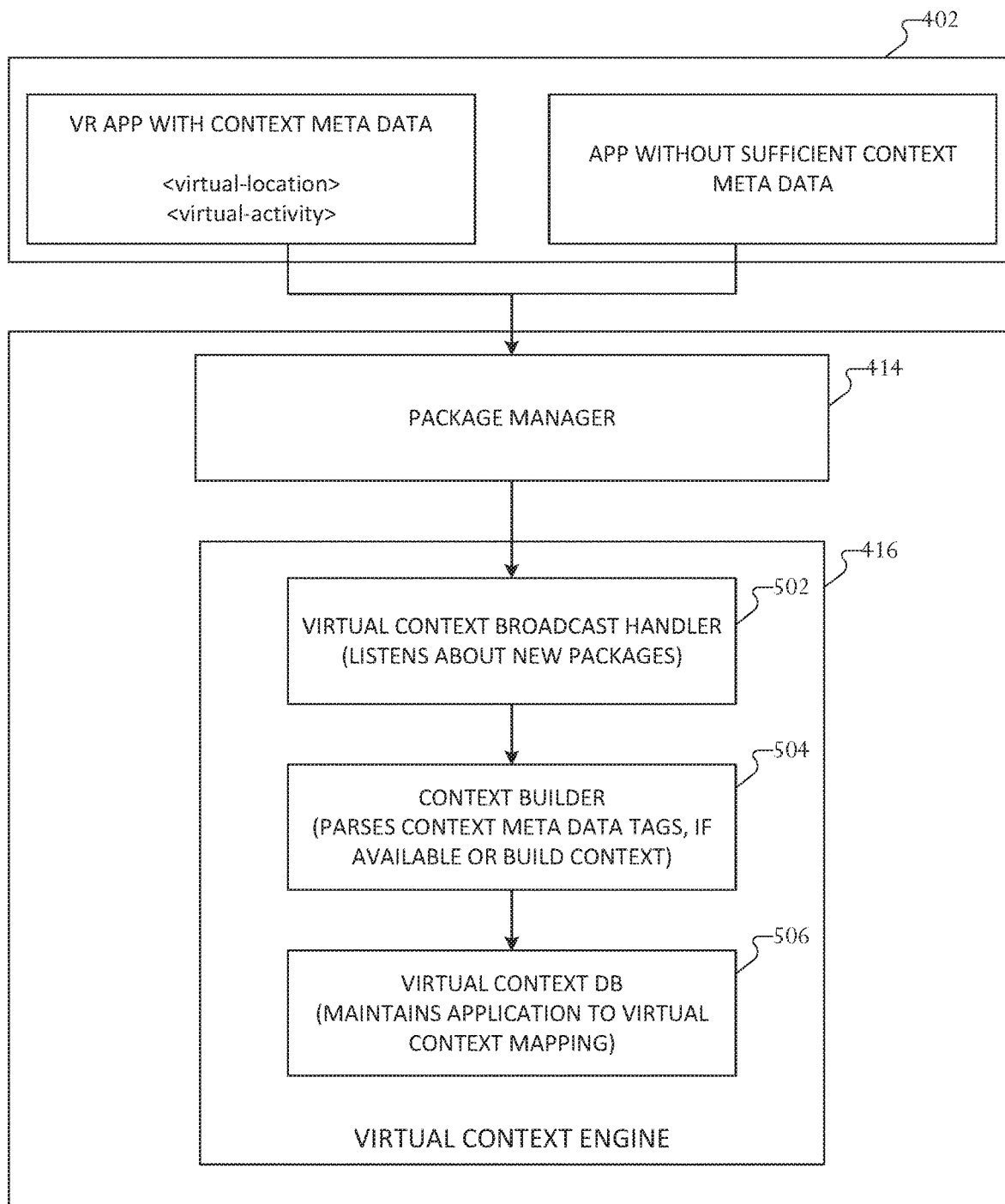
FIG. 5 illustrates an example embodiment of a virtual context engine according to this disclosure.

FIG. 5 illustrates an example of virtual context engine 416 of an embodiment of the present disclosure. The embodiment of the virtual context engine is for illustration only. Other embodiments could be used without departing from the scope of this disclosure.

The example embodiment of a virtual context engine 416 can include three parts being a virtual context broadcast handler 502, a context builder 504, and a virtual context database 506.

The virtual context broadcast handler 502, can be a broad receiver of data and metadata. The context broadcast handler 502 can monitor for existing VR applications and for VR applications that are being installed. When the virtual context broadcast handler 502 discerns or determines that a new, revised or an additional VR application is installed in the electronic device, the virtual context broadcast handler 502 passes on information, including metadata about the new, revised or additional VR application, to the context builder 504. The context builder 504 uses the provided information to build a virtual context file to be associated with the VR application. The virtual context file or database can then be stored in the virtual context database 506.

The context builder 504 can parse the VR application for metadata. The metadata can be in extensible markup language (XML) or another markup language that, for example, uses a defined set of rules for encoding documents in a format that is both human-readable and machine-readable. The metadata can also be in, for example, Java Script Object Notation (JSON), which is a lightweight data interchange format that is easy for humans to read and write. JSON is also easy for machines to parse and generate. Other markup languages and metadata formats can also be used by embodiments of this disclosure. The context builder 504 parses metadata and metatags found in metadata in order to find virtual context related information in a VR application. The context builder 504 gives the found virtual context information parsed from the VR application to the virtual context database 506. The virtual context database 506 stores the found virtual context information in a manner associated with the VR application from which it came.

The following is an example of a VR application with metadata that a virtual context engine 416 receives. In this example of a VR application with metadata, a user and his/her electronic device are geographically located in Mountain View, Calif. The electronic device receives instructions from the user to download a VR tour application. The VR tour application is downloaded into the electronic device, such as electronic device(s) 101-102 of FIG. 1 or electronic device 220-210 of FIG. 2. The developer of the of the VR tour application included initial or default contextual metadata in, with or associated with the VR tour application as shown below:

<location=Washington D.C., USA/>
<monument=National Air and Space Museum/>
<interest=tourism/>

The context builder 504 parses the location, monument, and interest metadata from the VR tour application and builds a virtual context file associated with the VR tour application. The virtual context file is stored in the virtual context database 506 in association with the VR tour application.

In various embodiments, the context builder 504 can determine when the VR application did not provide or does not include any or enough virtual context related metadata when the context builder 504 parses the VR application. In some embodiments, the context builder 504 builds virtual context in a variety of ways. Referring back to FIG. 4, the context engine 416 may query a VR server 406 or utilize a smart search engine to locate, create or add additional virtual context to use with a VR application that does not include enough context related information. The following is an example where the VR application does not include any metadata having virtual contextual information.

In this example of a VR application without contextual related metadata, a user of an electronic device is geographically located in Mountain View, Calif. The electronic device receives instructions from the user to download a VR application. The VR application is downloaded into an electronic device such as one of the electronic devices of FIGS. 1 and 2. The developer of the VR application did not provide or include any initial or default contextual metadata in, with or associated with the VR application.

In this situation, the context builder module 504 of the virtual context engine 416 is configured to look for and extract the name of the VR application and associated content data in the VR application. The context builder module 504 can then initiate a query to a VR server 406, 106 via a network, such as network 162 of FIG. 1. The VR server 406 is configured to maintain a database of metadata for a plurality of VR applications and provide metadata associated with an indicated VR application(s) when queried. If the VR server 406 does not have metadata associated with the particular VR application query, then the VR server 406 can use one or more search engines, such as one or more smart search engines, to search for and create metadata for the queried VR application and store the associated metadata for the queried VR application in a the VR server database for present and future use. In some embodiments, the search for and creation of metadata for the VR application may be performed on the electronic or mobile device. In either embodiment, the metadata associated with the VR application can be stored on the electronic or mobile device while being associated with the VR application. Once the virtual contextual data is acquired from the metadata associated with the VR application, the context builder 504 stores the virtual context to the virtual context database 506 in the electronic device. For example:

<location=Washington D.C., USA/>
<monument=National Air and Space Museum/>
<interest=tourism/>

The virtual context database 506 can be a database that maintains the virtual context data for each one of a plurality of VR applications. Table 1 depicts an example of a virtual context database in accordance with an embodiment of the disclosure. The virtual context database 506 can be stored on the electronic or mobile device.

TABLE 1

Virtual Context Data Base

| APPLICATION NAME | VIRTUAL CONTEXT DATA BASE |
|---|---|
| Socio Bowl | Sociobowl.db |
| Museum Tour | Museumtour.db |
| Archery | Archery.db |
| . . . etc. | . . . etc. |

Referring back to FIG. 4, the real context engine 420 can utilize a variety of sensors and technologies to collect and create real world context about the user or the environment about the electronic device. Real context can comprise a variety of physical world parameters associated with the user. The real context engine 420 can acquire location, activity, environmental, biometric, interests and preferences of or relating to the user from a variety of sensors and sources. For example, embodiments of the disclosure can determine were the user or electronic device is located in the physical world by utilizing existing technology such as global positioning system (GPS) sensors or techniques, wireless local area networks (WIFI) and other networks. Additionally, position tracking of the user or electronic device may be used in a given location to determine real world location information for real context associated with the user.

Various embodiments can use inertial measurement unit (IMU) sensors to determine what the user is doing in the real world. Combining information from an IMU sensor in the electronic device with data from position or location tracking sensors can be used by the real context engine to determine and check a user's activity while interacting with or wearing the electronic device. For example, embodiments can determine present or recent real world activities of the user, such as running, walking, standing, sitting, traveling in a vehicle, and climbing. Determined activities can be used by the real context engine to establish real context about the user.

Various embodiments can use environmental data collected from sensors or networks. Collected real or physical world environmental data or information can be included with the real context information. Environmental data may be collected by temperature, barometric, ambient light, altitude, humidity, vibration, and microphone and camera sensors on or incorporated into the electronic device. Additionally, use of the GPS location and the smart search engines can provide real world weather conditions that can be used as part of the real context information and by the real context engine 420. Real or physical world weather conditions may include, without limitation, current or expected information about rain, snow, temperature, wind direction and speed, cloud cover, time of day, moon phase, and sun, moon or star positions in the sky.

Various embodiments can sense and use user biometric data. For example, embodiments may have biometric sensors to detect the user's blood pressure, heart rate, body temperature, measure of sleep and awake time, mood, stress level, eye color and other biometric data. The detected biometric information can be provided to the real context engine 420 and be included with the real world context of the user.

User preferences may also be used by the real context engine 420 to create real context of the user. User preferences can include whether the user is color blind, interested in certain hobbies, sports, or activities more than other, products the user likes, whether the user is interested in changing the VR environment, favorite foods, activities, geographical locations, single, dating, married, with children, and many others. The user preferences can be entered via a UI by the user. Some embodiments the user preferences can be determined or derived over time based on the user's usage of the electronic device.

The real context engine 420 can combine or selectively combine the sensed or collected real world data for use in modifying or enhancing the virtual context to improve the immersive experience of the user. The real context can also be utilized to selectively provide non-obtrusive integration of marketing and advertisements into, for example, replaceable virtual objects the virtual world environment.

Figure 6:
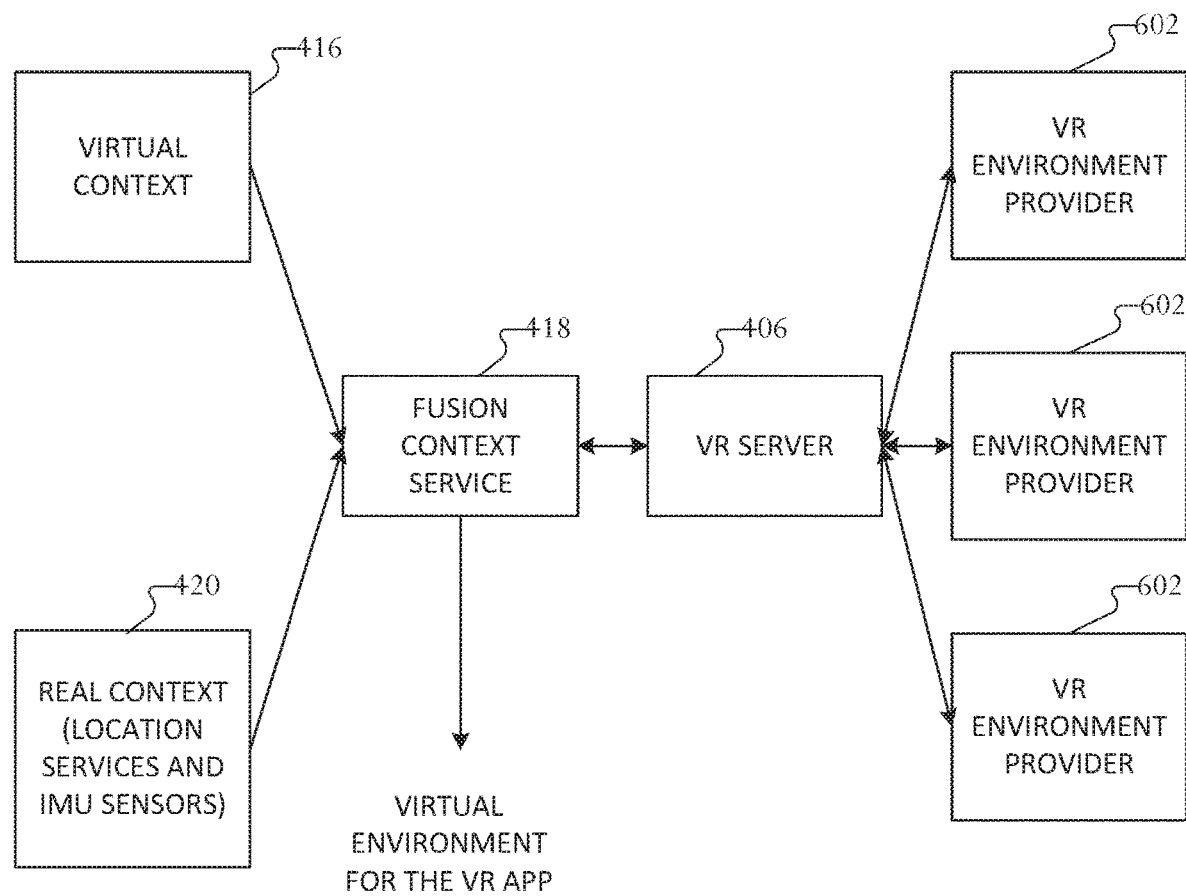
FIG. 6 is a block diagram that illustrates an example fusion context service according to this disclosure.

FIG. 6 illustrates an example embodiment of the fusion context service in accordance with an embodiment of the disclosure. FIG. 6 illustrates that for a given VR application, the fusion context service 418 uses virtual context from the virtual context database 416 to derive virtual context of the VR application in conjunction with the real context associated with the user, wherein the real context can include where the user is located, what the user is doing, and/or the physical environment surrounding the user. The fusion context service 418 creates fusion context from the virtual and real contexts. When additional virtual context or real context is needed by the fusion context service 418, the fusion context service 418 can request additional virtual or real context from the VR server 406 or from one or more VR environment providers 602. The resulting fusion context is a mix of the virtual context of the VR application in conjunction with the related real context so as to include user associated physical world detail with the virtual context. The fusion context is used by the fusion context service 418 process or module to find and select a custom VR environment provider for a given VR application that is running or being configured to run on the electronic device. The fusion context service 418, after selecting a custom VR environment provider for the given VR application, receives or retrieves relevant replacement virtual scene object data for display in the VR or custom environment viewed by the user. The fusion context service can also receive or retrieve custom VR environments that include replacement or replaceable virtual objects from relevant application sponsors, vendors, or marketing services. The replaceable virtual objects can seamlessly including in a VR environment and displayed on virtual billboards, walls or other non-obtrusive integrated locations in the VR environment designated for mark flags blowing in the wind or other non-obtrusive integrated locations in the VR environment designated for marketing of products or services.

The fusion context service 418 can also manage integration and seamless placement of the fusion context related objects in the VR environment. The fusion context related objects can be applied, placed or overlaid over or in place of default VR application objects without intruding into the user's VR experience.

The fusion context service 418 provides the fusion context that is used to obtain replacement objects and custom environments that change a default virtual environment of the VR application into a virtual reality experience that can be more real and relevant to the user's real world environment by including real world context into the VR environment of the VR application. Additionally, the fusion context service 418 provides for non-intrusive and seamless marketing and advertisement opportunities for real world vendors by enabling them to showcase their products or services to a user in a virtual environment in ways that emulate marketing and advertising in the real or physical world. Additionally the products and services showcased in the VR environment can be relevant to the user's real world interests.

In the event there are no relevant marketing or advertising content available, the VR application can nearly display the default or static virtual content from the virtual context database in the VR environment of the VR application.

Figure 7:
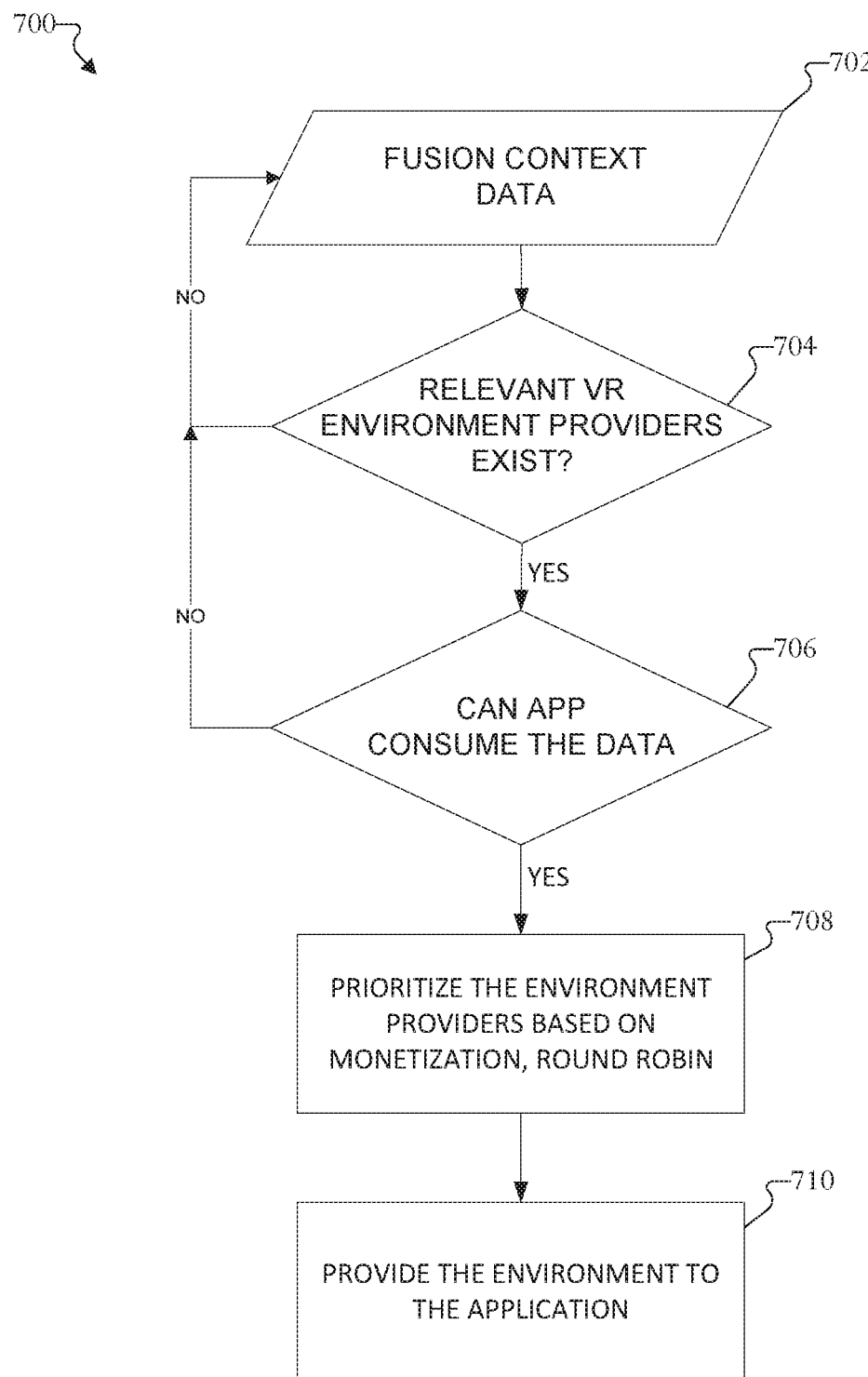
FIG. 7 is a flow chart that illustrates an example of a fusion context service process according to this disclosure.

FIG. 7 illustrates an example of a process for the fusion context service in accordance with an embodiment of the invention. The process embodiment for the fusion context service is for illustration only. Other embodiments could be used without departing from the scope of this disclosure.

FIG. 7 is an example flow diagram of a fusion context service process 700. At 702 the fusion context service creates fusion context data from the virtual context data and the real context data. The fusion context data includes both virtual context and real world contextual elements so that the fusion context includes real world details relevant to the user in conjunction with the virtual context of the VR application. At 704, the fusion context service determines whether a provider exists that provides VR content, objects, environments or marketing content for the VR application and whether such content is relevant to fusion context data. If no provider exists, then the process may return to 702. If the provider of relevant content does exist, then the process proceeds to 706, where the fusion context service determines whether the VR application can, place utilize the relevant context data from the provider. If the VR application cannot consume the relevant context data, then the process returns to step 702. If the VR application can consume the relevant context data that is available, then at 708 the fusion context service selects from the one or more potential content providers to determine from which content provider that the electronic device should obtain the relevant context. The fusion context service may select the content provider based on a fixed setting, an algorithm or a selection method. The algorithm or selection method may be dependent on the user's geographical location, monetization of the advertisement or marketing, or perhaps a round-robin technique. The round-Robin technique may obtain the relevant context from content providers using the selective repetitive order so each of the selected content providers may be selected based on a circular repetitive order. Additionally, embodiments may prioritize content provider's content based on the user's preconfigured choices, selections or application discernable interests.

At 710, the fusion context service obtains and provides the relevant content in the form of replacement objects, custom VR environments, and related content to the VR environment framework for use and incorporation into the VR application that is running or being prepared preparing to run on the electronic device so that the relevant content can be displayed in the VR environment.

FIGS. 8A, 8B, 8C, and 8D illustrate an example scenario of an embodiment that transitions real world context to virtual context. The example scenarios depicted in FIGS. 8A-8D are for illustration only and other examples and scenarios could be applied without departing from the scope of the present disclosure.

Figure 8A:
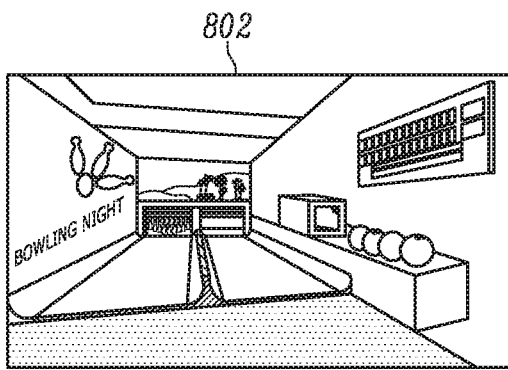
FIGS. 8A, 8B, 8C and 8D illustrate an example scenario of an embodiment that transitions physical world context into virtual context according to this disclosure.
Figure 8B:
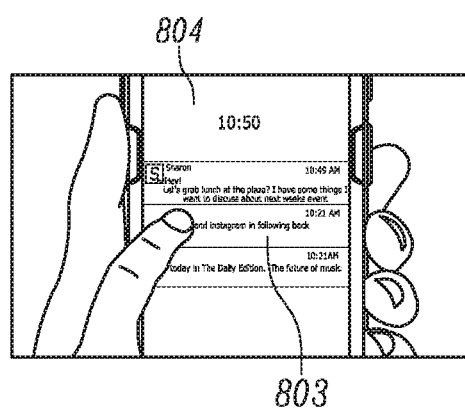

In the illustrated example of FIGS. 8A and 8B, a user of the electronic device lives in Mountain View, Calif. and physically goes bowling at a Bowl Night Bowling Alley that is also located in Mountain View, Calif. and physically sees and hears the environment and atmosphere of the bowling alley 802. Based on the user's electronic device or mobile device recognizing that the user visited a geographical location of a bowling alley and that a VR bowling application is available to the user, the fusion context service of an embodiment of this disclosure may retrieve real context associated with the bowling alley and pass it on to the virtual context engine. The virtual context engine builds historic context about the user that is associated with the user's bowling activity and stores the historic context for potential future use in association with a VR application at a later time. The created historic context may include:

<location=bowling alley/>
<interest=games, entertainment/>
<activity=bowling/>

Figure 8C:
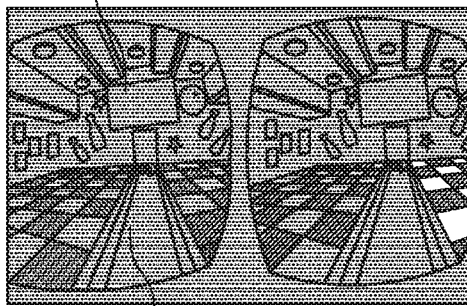
Figure 8D:
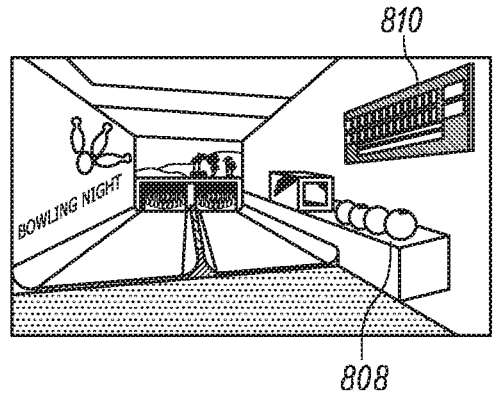

FIG. 8B shows that the fusion context service may also use real world context information, Bowl Night Bowling Alley, Mountain View, Calif.) to create and provide one or more recommendations to the user on a UI 803 of the electronic device 804. The one or more recommendations on the UI 803 may include:

a) Giving the user an option to add a Bowl Night Bowling Alley VR Provider, if the fusion context service determined that it exists, as a preferred, favorite or optional source for recreating a Bowl Night Bowling Alley environment that is similar to real world Bowl Night Bowling Alley experience in a VR bowling environment when the user is playing bowling in a VR bowling application.

b) If the user wants to go bowling (i.e., play bowling) and initiates a search for a real world bowling alley on the electronic device, but the search results indicate that are no real world bowling alleys within a predefined distance nearby, the fusion context service may initiate a recommendation to the user to install and play a VR bowling application.

c) In FIGS. 8C and 8D, if the user downloads or already has a VR bowling application installed, the fusion context engine may recommend using historic and real context that creates a VR bowling environment that is similar to the real world Bowl Night Bowling Alley environment with which the user is familiar. If the user agrees, the fusion context service may change the default virtual context, including one or more of default virtual objects, such a score board 807, of the default VR bowling application's VR environment 806 to include relevant replacement objects, such as a relevant scoreboard object 810. The fusion context service may also change the default environment 806 and replace it with a custom VR environment 808 in order to create a VR environment that incorporates relevant objects from the real world Bowl Night Bowling Alley into the VR environment that may be recognizable to and experienced by the user.

Thus, FIGS. 8C and 8D illustrate how a default environment that includes default virtual context 806 and a default object 807 transitions from merely comprising default context to also including real physical world related fusion context that includes a relevant replacement content object 810 and custom VR environment 808 obtained from a VR provider.

d) The fusion context service may also recommend one or more VR controllers appropriate for operating or running the VR bowling game.

Figure 9:
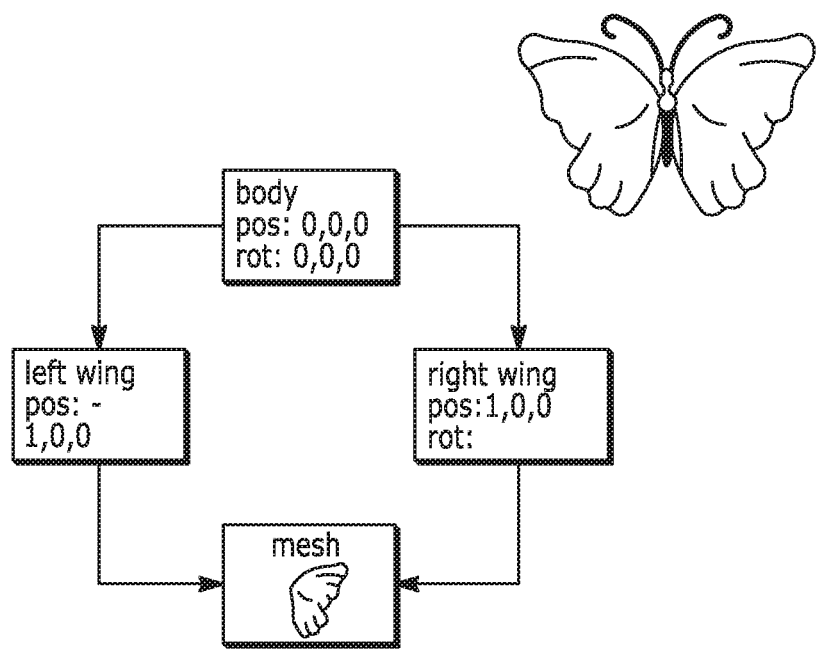
FIG. 9 illustrates an example of a display of a virtual object in a VR framework is an object description on a 3D scene according to this disclosure.

FIG. 9 illustrates an example of a display of a butterfly in a VR framework as an example object description on a 3D scene and scene graph. In various embodiments the adjustment of the virtual content with real content may be performed using a 3D scene and scene graph. A 3D scene may be represented as a hierarchy of VR framework scene objects. Each visible object can have a triangle mesh describing its shape, material that determines its appearance, and transform matrix that controls its position in the 3D virtual environment world.

The scene graph describes the spatial relationship between objects in the scene. Each scene object can have a 4×4 transformation matrix to position and orient the virtual object locally. The scene objects may be nested so that the transformations of the parent nodes are inherited by the children nodes. This allows objects to be easily positioned and animated relative to one another.

VR application developers, when constructing a VR framework application, subclass VR Activity by providing initialization code to create a VR Main to set up the initial 3D scene and handle input events.

FIG. 9 illustrates the display of, for example, a virtual butterfly object in a VR framework. Various embodiments can use Gear VR Framework language, but it is understood that a variety of VR framework related languages can also be used. In the following example Gear VR Framework language is used and the resource file may look similar to the below:

```
<MainScene>
    <GVRSceneObj>
        <data = body>
        <pos = 0,0,0>
        <rot = 0,0,0>
    </GVRSceneObj>
    <GVRSceneObj>
        <data = leftwing>
        <pos = 0,0,0>
        <rot = 0,0,0>
    </GVRSceneObj>
    <GVRSceneObj>
        <data = rightwing>
        <pos = 0,0,0>
        <rot = 0,0,0>
    </GVRSceneObj>
</MainScene>
```

A new tag for the GVRSceneObj may be introduced called fusionobject. If the fusion object is marked true, the scenegraph renderer can then talk to the Fusion context service and get a fusion object.
Updated Scene object:

```
<GVRSceneObj>
    <data = plant>
    <pos = 0,0,0>
    <rot = 0,0,0>
    <fusionobject= true>
</GVRSceneObj>
```

The scenegraph renderer checks the fusion object flag as true and gets a plant object from the fusion context service. A fusion context service based on the location context can communicate with environment VR providers over a network. The environment VR provider can be a nursery for plants in the geographic vicinity of the user.

The resource file for the original application may be shown below.

```
<MainScene>
    <GVRSceneObj>
        <data = room_export >
        <pos = 0,0,0>
        <rot = 0,0,0>
    </GVRSceneObj>
    <GVRSceneObj>
        <data = floor>
        <pos = 0,0,0>
        <rot = 0,0,0>
    </GVRSceneObj>
    <GVRSceneObj>
        <data = wall>
        <pos = 0,0,0>
        <rot = 0,0,0>
    </GVRSceneObj>
    <GVRSceneObj>
        <data = sidewall1>
        <pos = 0,0,0>
        <rot = 0,0,0>
    </GVRSceneObj>
    <GVRSceneObj>
        <data = sidewall2>
        <pos = 0,0,0>
        <rot = 0,0,0>
    </GVRSceneObj>
    <GVRSceneObj>
        <data = pins>
        <pos = 0,0,0>
        <rot = 0,0,0>
    </GVRSceneObj>
    <GVRSceneObj>
        <data = ball>
        <pos = 0,0,0>
        <rot = 0,0,0>
    </GVRSceneObj>
</MainScene>
```

The above objects can be loaded and transformed in the framework 410 of an embodiment as shown in FIG. 4. As already described, FIGS. 8C and 8D show a default VR environment 806 and default VR object 807 are transformed within the framework 410 into a custom VR environment 808 with a custom VR object 810.

The resulting resource file may be similar to the one below in XML, where the default virtual context based VR environment can be dynamically changed with content context obtained via the network from one or more VR environment providers.

```
<MainScene>
    <GVRSceneObj>
        <data = room_export >
        <pos = 0,0,0>
        <rot = 0,0,0>
        <fusionobject= true>
    </GVRSceneObj
    <GVRSceneObj>
        <data = floor>
        <pos = 0,0,0>
        <rot = 0,0,0>
        <fusionobject= true>
    </GVRSceneObj
    <GVRSceneObj>
        <data = wall>
        <pos = 0,0,0>
        <rot = 0,0,0>
        <fusionobject= true>
    </GVRSceneObj
    <GVRSceneObj>
        <data = sidewall1>
        <pos = 0,0,0>
        <rot = 0,0,0>
        <fusionobject= true>
    </GVRSceneObj
    <GVRSceneObj>
        <data = sidewall2>
        <pos = 0,0,0>
        <rot = 0,0,0>
        <fusionobject= true>
    </GVRSceneObj
    <GVRSceneObj>
        <data = pins>
        <pos = 0,0,0>
        <rot = 0,0,0>
        <fusionobject= true>
    </GVRSceneObj
    <GVRSceneObj>
        <data = ball>
        <pos = 0,0,0>
        <rot = 0,0,0>
        <fusionobject= true>
    </GVRSceneObj
</MainScene>
```

Referring back to FIG. 4, a scene graph module in the VR framework 412 can then parse through the XML file. For fusion objects marked true, the VR framework can request the fusion context service 418 to fetch appropriate replaceable objects from VR providers 406 and 408. The updated VR environment, with relevant or replaced objects in seamlessly incorporated newly defined positions can be transformed to, for example, the indicated custom VR environment 808 with object 810 of FIG. 8D, which provides a recognizable look and feel of a real world or selected bowling alley that the user may be familiar with or has chosen.

The following describes some example use scenarios for embodiments of the disclosure.

In a first example scenario, a VR bowling application and a user's physical location are involved. A user who is physically located in Mountain View, Calif. downloads the SocioBowl VR application into his electronic device. The VR application developer of the SocioBowl VR application has included initial or default virtual content metadata associated with the VR application as shown below:

<location=Bowling Alley/>
<Monument=NA/>
<Interest=Games, Entertainment/>
<Activity=Bowling/>

Upon installation of the VR bowling application, the virtual context engine parses through the metadata of the SocioBowl VR application and creates the virtual context for the VR application, being <user playing bowling in a bowling alley listening to Katy Perry's song>.

The fusion context service can use the created virtual context in conjunction with real world context associated with the user (<location=Mountain View, Calif.>) and come up with one or more of the following recommendations that can be provided to the device user. The fusion context service may recommend to the user to change the default or initial VR environment of the VR application to a custom VR environment created from or based on a real world bowling alley location geographically near the real context location information associated with the user. The fusion context service may provide a selection of one or more real world bowling alley location environments to choose from that are geographically within a predetermined distance from the user from which the user can choose. In various embodiments, the fusion context service may recommend directions to one or more nearby real world bowling alleys and associated promotions. The fusion context service may also recommend purchasing Katy Parry's latest music album, or might recommend or download similar VR game applications.

If the user selects the recommendation to change the default VR environment of the VR application to a custom VR environment created from or based on a real world bowling alley, the fusion context service, operating within the device framework, changes the default VR environment to the real world related VR environment based on "Bowl Night Bowling Alley" in Mountain View, Calif. The user may have selected the particular real world custom VR environment or the fusion context service may have selected the particular custom VR environment based on the user having visited the real world location, the distance to the real world location, on marketing support of the VR application, or a predetermined selection process of one of a plurality available VR environments that meet the fusion context criteria.

If available, the fusion context service may initiate retrieval of a live 360 degree VR background feed from the Bowl Night Bowling Alley location and overlay the application's bowling lane custom VR environment, balls and VR game play. In some embodiments, the user may be able to play against other VR users of the bowling application in real time. In yet other embodiments, the VR bowling application can allow the user to play multi-player games with real world or VR bowling players physically located at the that real location.

If a live feed is not available, the fusion context service may bring one or more replacement scene objects that are based on actual scenery at the Bowl Night Bowling Alley. The fusion context service may incorporate the scene objects into the custom VR environment. The VR application and the framework render the replacement scene objects in the VR environment to create a VR environment that mimics or simulates aspects of the real world bowling alley experience for the user.

Additionally, in various embodiments, the provider of the custom VR environment or of advertisements posted as decor objects in the VR environment can be selected by a predetermined selection algorithm, be dependent on user's location, monetization, round-robin selection, or by a preconfigured user choice or interest relationship.

In a variation of or extension of the first example scenario above, a user of a VR application can be exploring an art museum in VR. Based on real context about the user, such as the user's physical location, e.g., Mountain View, Calif., the fusion context service may initiate a smart search for art created by local artists and embed such found real content art into the VR environment of the VR art museum tour.

In a second example scenario, a VR museum tour application is configured to provide a VR environment. A user who is physically located in, for example, Mountain View, Calif. downloads the VR tour application into an electronic device such as a mobile device or VR system. The VR tour application developer provides initial or default virtual content metadata with the VR tour application:

<location=Washington D.C., USA/>
<Monument=National Air and Space Museum/>
<Interest, Tourism/>

Upon installation the VR tour application, the virtual context engine parses through the context metadata of the application and creates the virtual context for this application, <user being in Washington touring the National Air and Space Museum>, on the electronic device.

The fusion context service can use the created virtual context in conjunction with the real world context associated with the user (Mountain View, Calif.) and come up with one or more recommendations that can be provided to the user via the electronic device. The fusion context service can query, via a network, for a National Air and Space Museum VR provider to provide a live feed of the museum, a custom environment or 3D relevant scene objects of real objects in the museum. When the fusion context service receives a live feed, a custom environment or relevancy, an embodiment can render one or more of the live feeds for use in the VR application as a live 360 background view. Relevant scene objects can be placed seamlessly in the VR tour application environment. The fusion context service may also give the user, via a UI of the electronic device, a recommendation or option to view live feeds or 3D objects from one or more other VR museum content providers geographically within a defined or predetermined distance from the user's present physical location. The fusion context service may also recommend to the user other similarly categorized monuments or museums that the user might enjoy visiting physically or virtually. For example, the NASA AMES Research Center in Mountain View, Calif. can be recommended to the user to visit physically or virtually. Discounts or promotions for similarly related or categorized places or monuments can also be retrieved and recommended to the user of VR tour application. In some embodiments, the fusion context service can further recommend travel plans to Washington D.C. from Mountain View, Calif. The travel plans can include recommendations for purchases of airline tickets, hotel accommodations, ground transportation along with dates and discount promotion information.

In a third example scenario, a VR application, such as a VR cinema application, without sufficient context metadata is discussed. A user who is physically located in Mountain View, Calif. downloads a VR cinema application. The VR cinema application developer did not provide or include any context metadata associated with VR cinema application. The context builder module of the virtual context engine determines the name of the movie that the user selects to view in the VR cinema application. The context builder can initialize a network or internet search of the movie name. From received search results, the context builder module builds metadata associated with the movie name that can include metadata like a list of actors in the movie, the movie director, the year the movie was released, awards won by the movie, the movie subject matter, whether the movie is drama, science fiction, history, action, adventure, mystery, comedy, animated, or within other categories of movies, the movie's rating or other information about the movie. The built meta data may look like below:

<Interest=Entertainment>
<Name of movie=Wonder Woman/>
<Actors=Gal Gadot, Chris Pine, Robin Wright/>
<Awards won=NA/>
<Year of Release=2017/>

The fusion context service may use the virtual context in conjunction with the real world context associated with the user (<location=Mountain View, Calif.>) and derive with recommendations to present to the user via the electronic device. The fusion context service may recommend or automatically retrieve a live or prerecorded 360 feed from a geographically nearby movie theatre or from a theater of the user's choosing, and overlay the playing of the movie in a VR environment on the feed, giving the user a VR sense or feel of sitting in the theater watching the movie among an audience. If no live feed is available from a VR provider or movie theater, the fusion context service may search, via a network or internet for a VR server or for a third party provider, for a custom movie theater VR environment with relevant replacement scene objects that are from the nearby theater or another theater selected by the user for use in creating a VR theater environment that mimics or has details from a theater that the user may recognize or like. In various embodiments, the fusion context service can retrieve and provide movie show times or offer to sell tickets for movie showings in geographically nearby theaters within a predetermined distance. Various embodiments can offer or recommend for purchase or rent downloads or DVDs of movies that the user may also be of interest. Additionally, recommendations can be provided that highlight other entertainment options in the user's geographical area. Information about, for example, plays, performances or live shows, can be retrieved and provided for the user to peruse and potentially select.

In a fourth example scenario, a VR golf application and a user's physical location and environmental details are involved. In this example scenario, a user who is physically located outside and at Cuesta Park in Mountain View, Calif., is using his VR enabled electronic device during morning hours of a partly cloudy and breezy day. The user may have in the past indicated that he has interests in pizza and fitness.

The VR golf application is loaded into the user's electronic device. The VR application's developer included initial or default virtual content metadata with the VR golf application as shown below:

<Location=Golf Course/>
<Weather, Clear/>
<Interest, Games, Entertainment/>
<Activity, Golfing/>

Upon installation of the VR golf application, the virtual context engine parses through the metadata of the VR golf application and creates the virtual context for the VR application. In other words, the virtual context may be <playing golf on a golf course in clear weather>.

The fusion context service of an embodiment uses the determined virtual context in conjunction with real world context associated with the user that is determined by the electronic device. An example of the determined real world context can be:

<location=Mountain View, Calif., Outside,/>
<Time=10:00 a.m. pacific time, morning/>
<Weather=cloudy with light breeze
<Interests=pizza, fitness/>

The fusion context service may also collect via an Internet search specific GPS information related to the direction that the user is facing, weather (wind, temperature, cloud cover) conditions at the geographic location. The fusion context service may also collect marketing or sponsorship information related to the user's indicated interests.

FIGS. 10A, 10B, 10C, and 10D illustrate VR rendering based on real-world conditions according to embodiments of the present disclosure. The embodiments of the real-world conditions shown in FIGS. 10A-10D (collectively FIG. 10) are for illustration only and other conditions, renderings, and illustrations could be used without departing from the scope of the present disclosure.

In various embodiments, the fusion context engine can automatically perform or make one or more of the following adjustments to VR environment based on the fusion context. The fusion context engine may initiate a request to the user, via the electronic device, to change the default or initial VR environment of the VR golf application to a VR environment that includes real world based information derived from a combination of the virtual context and the real context. If the user accepts the recommendation, the fusion context engine may include shadows on the golf course relative to the actual position of the sun in the direction in the rendered area to which the user is facing. Since the real context indicated the day is partly cloudy, clouds and shadows of clouds may be included in the VR golf environment experience. The fusion context service may also adjust the direction of flags blowing in a breeze relative to the wind and weather conditions determined at the user's geographic location and with respect to the rendered area in the direction that the user is facing. Additionally, the fusion context service may search and obtain custom VR golf course information for a golf course located in Mountain View, Calif. from a VR golf provider so that the user is playing at a VR replica of a nearby golf course that user is in has played on before. Signage about the golf course may include 3D objects relevant to local pizza or national chain pizza restaurants and fitness foods, fitness facilities, vitamin shops, or personal trainers who offer fitness services in the geographical area in order to meet some of the real context interests of the user. The fusion context service may also provide the user locations and fairway fee information at local golf courses in the area.

In the example shown in FIG. 10, either the electronic device 101 or the VR server 106, can automatically perform or make one or more of the following adjustments to VR environment based on the fusion context: vary a sunlight, vary shadows, vary weather such as rain, wind and snow, or a combination of these. For example, based on a geographic location of the user, the fusion context engine determines a time of day and corresponding sun position. The fusion context then, for each object rendered, calculates a corresponding length (L) of a shadow cast from a respective height (h) of the object based on an angle (a) of the sun's position. An example shadow calculation is:

$$L = \frac{h}{\tan(\theta)} \quad (1)$$

As the user changes the viewing direction, i.e. as the user moves their head to view a different area of the VR environment, the fusion context engine automatically renders shadows of new objects rendered.

Figure 10A:
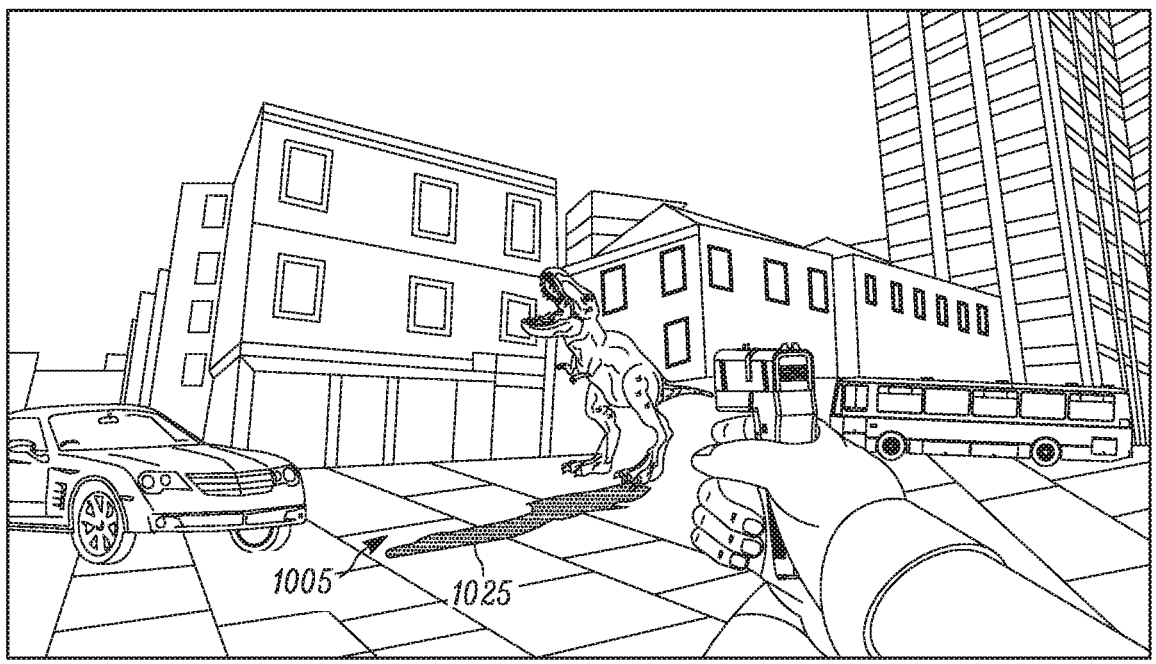
FIGS. 10A, 10B, 10C, and 10D illustrate VR rendering based on real-world conditions according to embodiments of the present disclosure.
Figure 10B:
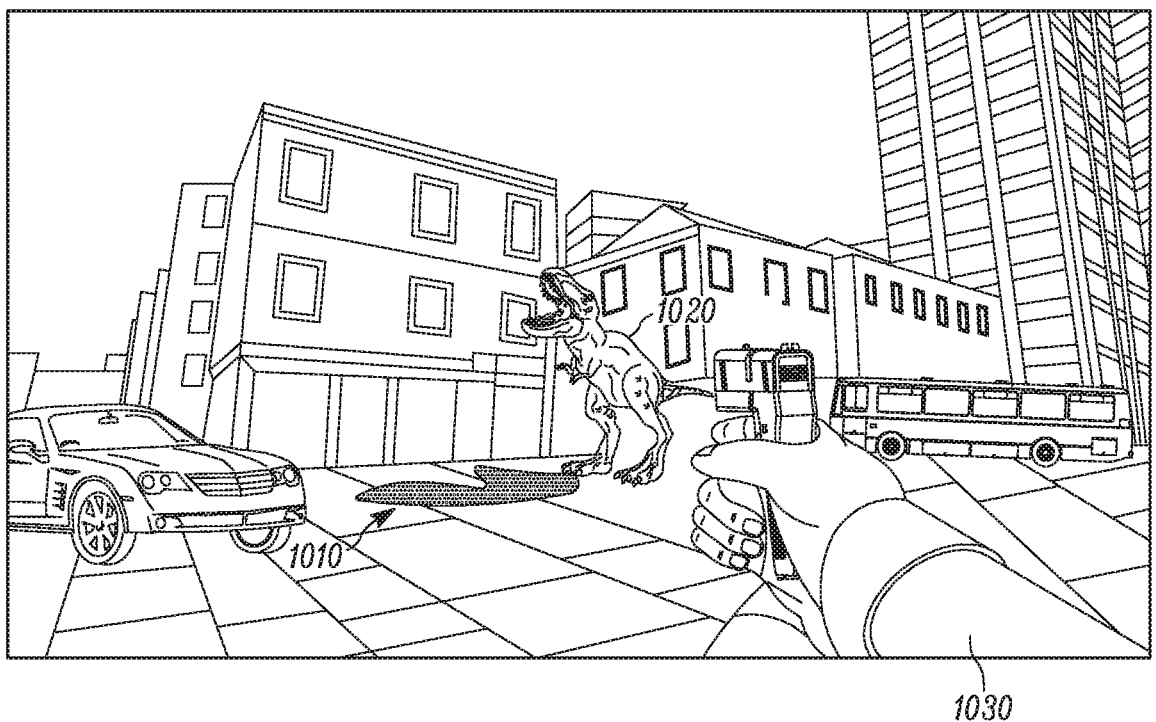

In the example shown in FIGS. 10A and 10B, a game with VR game user shooting at dinosaurs 1020 in a city block is depicted. The fusion context engine enhances immersion by how big the dinosaur is seen. The fusion context engine adjusts the shadow 1025 length of the dinosaur 1020 using Equation 1, where θ is the sun angle. The fusion context engine adjusts shadow 1025 length and position based on the movement of the sun. For example, the shadow 1025 appears at first position 1005 in FIG. 10A and appears in second position 1010 in FIG. 10B. Additionally, as the user faces a moving object, such as dinosaur 1020, the fusion context engine adjusts the shadow 1025 based on movements of the moving object 1020. The fusion context engine also can render a shadow to darken the dinosaur 1020 when the position of the sun is behind the dinosaur 1020. The fusion context engine also can render a shadow across the rendered arms 1030 of the user when the sun position is behind the user or render the sun or other brightened image in front or to the side of the user depending on a location of the sun or other light source. For example, if the user looks in a direction of the current position of the sun, the fusion context engine can render the screen entirely white, but a low level, to simulate that the user is blinded by the sun.

Figure 10C:
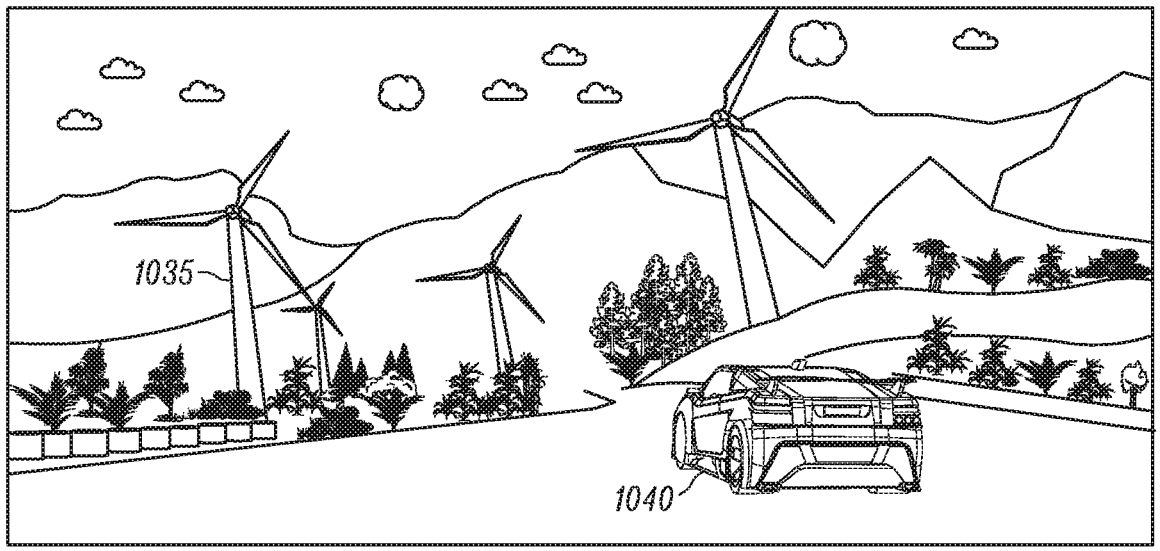

In the example shown in FIG. 10C, an immersive environment with wind mills is depicted. Based on the wind speed and direction, the fusion context engine adjusts the windmill 1035 fans in the VR environment. When the user dons and engages the VR headset, the fusion context engine calculates wind speed and wind direction to enhance VR immersive experience. Wind speeds can be calculated using an embedded anemometer on the head mount or the electronic device 101 is docked into the head mount device. The anemometer can be as described at "Development of Hall sensor propeller anemometer for measuring wind speed using embedded controller" by G Karthick Kumar Reddy, S Venkatramana Reddy, and T. K Ramkumar, 2012 International Conference on Communications, Devices and Intelligent Systems (CODIS), 28-29 Dec. 2012, the contents of which are incorporated by reference in their entirety. In certain embodiments, the fusion context engine obtains wind data from an external source, such as a cloud service that gives the wind speed to the client device using a REST API call. For example, in a race car game and based on the wind speed and direction, the fusion context engine adjusts the race to be harder or easier for the driver. If the wind is in the same direction as a car 1040 is moving, the racer completes the race faster. The fusion context engine may render objects blowing across the path of the car 1040 depending upon wind direction. Additionally, based on wind speed and direction, the fusion context engine may vary a maneuverability of the car 1040 such as pushing the car to the side when the wind is blowing very strongly from the side. Accordingly, the fusion context engine is able to make the race much more unpredictable and interesting to a user experience.

Figure 10D:
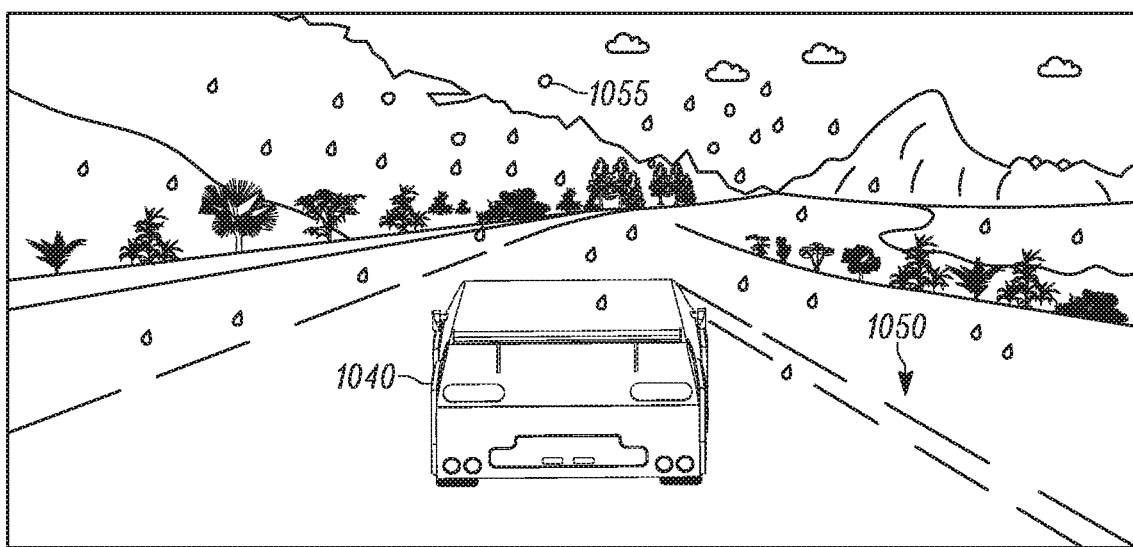

In the example shown in FIG. 10D, another immersive environment based on weather conditions is depicted. Based on the weather conditions, the fusion context engine adjusts the VR environment. When the user dons and engages the VR headset, the fusion context engine determines, such as via sensors located in electronic device 101, from server 106, or via an external device or input, to enhance VR immersive experience. The fusion context engine determines weather effects, such as rain, and natural sounds, such as birds, waves or wind, to enhance the VR experience. For example, in the race car game and based on the weather, such as rain, the fusion context engine adjusts the race to be harder or easier for the driver. If the fusion context engine determines that it is raining, the fusion context engine adjusts the VR environment by rendering the road 1050 to have a wet surface and places rain droplets 1055 on the screen or dashboard. Additionally, based on the speed and maneuvering by the user, the fusion context engine can cause the car 1040 to slip on the surface. Accordingly, the fusion context engine is able to make the race much more unpredictable and interesting to a user experience.

As such, according to certain embodiments of the present disclosure, the fusion context engine is able to vary a user experience based on real-world conditions by adjusting based on user context and VR Content. For example, in a situation in which a user is wearing VR outside, the user may feel the wind, sunlight, sound (such as birds chirping), rain drops, and the like, as part of being in a real-world. The fusion context engine determines the real-world conditions and adjusts VR Content to reflect the context in a VR content the user is watching. If the wind is blowing in the real-world, for example, a flag in the VR content flutters in the wind in a manner corresponding to the real-world wind. When the user is outside and feels the sun shine on his skin, the fusion context engine renders content that shows the sun and shadows corresponding to the positions of the sun at the user's geographic location. By augmenting the VR content based on real-world environmental conditions, the fusion context engine is able to render a more immersive experience for the user. That is, the user's physical sensation of feeling wind blowing, sun on their skin, or rain matches the information that the user sees in the VR content. As such, the user does not have a disconnect between real-world sensations and VR content and is able to become more immersed in the VR experience.

Although the present disclosure has described, with various exemplary embodiments, various changes and modifications may be suggested to skilled in the art. It is intended that the present disclosure encompass such changes and modifications that fall within the scope of the appended claims.

What is claimed is:

1. An electronic device comprising:
   a display configurable for use in a head mountable device (HMD);
   one or more sensors;
   a network interface;
   a memory; and at least one processor coupled to the display, the memory, the network interface and the one or more sensors, the at least one processor is configured to:
  determine a first context for a virtual reality (VR) application, the VR application comprising a default virtual object in a virtual environment;
  obtain a second context based on a physical world environment, wherein the second context is based on at least one of (i) a present physical location of a user, (ii) an activity of the user or (iii) an interest of the user;
  combine the first context with the second context to create a combined context, the combined context includes physical world details with the first context;
  determine whether a replacement virtual object is available, the replacement virtual object being a relevant virtual object that is relevant to the combined context;
  when the replacement virtual object is available:
    obtain the replacement virtual object and substitute the default virtual object with the replacement virtual object in the virtual environment; and
    display the virtual environment comprising the replacement virtual object.

2. The electronic device of claim 1, wherein when the at least one processor determines the first context for the VR application, the processor is configured to parse the VR application to obtain metadata comprising the first context associated with the VR application.

3. The electronic device of claim 2, wherein when the at least one processor obtains metadata associated with the VR application, the at least one processor is configured to obtain the metadata from an external server via the network interface.

4. The electronic device of claim 1, wherein the first context comprises a default location and a default activity to be performed in the virtual environment.

5. The electronic device of claim 1, wherein the second context is obtained from the at least one or more sensors, the memory, or the network interface; and wherein the second context is further based on at least one of (i) physical world environment data associated with the present location of the user, (ii) biometric data of the user or (iii) a preference of the user.

6. The electronic device of claim 5, wherein the replacement virtual object comprises an augmentation based on the second context.

7. The electronic device of claim 1, wherein the at least one processor is further configured to determine whether a custom VR environment relevant to the combined context is available with the replacement virtual object; and
  when the custom VR environment is available, the at least one processor is further configured to obtain the custom VR environment and substitute the custom VR environment as the virtual environment.

8. The electronic device of claim 7, wherein the at least one processor is further configured to select and obtain at least one of the replacement virtual object and the custom VR environment from one of a plurality of VR provider servers, the one of the plurality of VR provider servers being selected based on a predetermined VR provider server prioritization.

9. A method for dynamically changing a virtual reality (VR) environment, the method comprising:
  providing an electronic device configurable for use in a head mountable device (HMD), the electronic device comprising one or more sensors, a network interface, a memory and at least one processor;
  determining a first context for a VR application, the VR application comprising a default virtual object in a virtual environment;
  obtaining second context based on a physical world environment, wherein the second context is based on at least one of (i) a present location of a user, (ii) an activity of the user or (iii) an interest of the user;
  combining the first context with the second context to create a combined context, the combined context includes physical world details with the first context;
  determining whether a replacement virtual object is available, the replacement virtual object being a relevant virtual object that is relevant to the combined context;
  when the replacement virtual object is available:
    obtaining the replacement virtual object and substituting the default virtual object with the replacement virtual object in the virtual environment; and
    displaying the virtual environment comprising the replacement virtual object.

10. The method of claim 9, wherein determining the first context for the VR application comprises parsing the VR application to obtain metadata comprising the first context associated with the VR application.

11. The method of claim 9, wherein determining the first context for the VR application comprises obtaining metadata associated with the VR application from an external server via the network interface.

12. The method of claim 9, wherein the first context comprises a default location and a default activity to be performed in the virtual environment.

13. The method of claim 9, wherein obtaining the second context comprises obtaining the second context from the at least one or more sensors, the memory, or the network interface; and wherein the second context is further based on at least one of (i) physical world environment data associated with the present location of the user, (ii) biometric data of the user, or (iii) a preference of the user.

14. The method of claim 13, wherein the replacement virtual object comprises an augmentation based on the second context.

15. The method of claim 9, further comprising determining whether a custom VR environment relevant to the combined context is available with the replacement virtual object; and
  when the custom VR environment is available, obtaining the custom VR environment and substituting the custom VR environment as the virtual environment.

16. The method of claim 15, further comprising obtaining at least one of the relevant virtual object and the custom VR environment from one of a plurality of VR provider servers, the one of the plurality of VR provider servers being selected based on a predetermined VR provider server prioritization.

17. A non-transitory computer readable medium comprising program code for dynamically changing a virtual reality (VR) environment that, when executed by at least one processor, causes an electronic device to:
  determine a first context for a VR application, the VR application comprising a default virtual object in a virtual environment;
  obtain a second context based on a physical world environment, wherein the second context is based on at least one of (i) a present location of a user, (ii) an activity of the user or (iii) an interest of the user;

combine the first context with the second context to create a combined context, the combined context includes physical world details with virtual context;

determine whether a replacement virtual object is available, the replacement virtual object being a relevant virtual object that is relevant to the combined context;

when the replacement virtual object is available:
- obtain the replacement virtual object and substitute the default virtual object with the replacement virtual object in the virtual environment; and
- display the virtual environment comprising the replacement virtual object.

18. The non-transitory computer readable medium of claim 17, comprising computer code that when executed by the at least one processor to determine the first context for the VR application, parses the VR application to obtain metadata comprising the first context associated with the VR application.

19. The non-transitory computer readable medium of claim 17, further comprising computer code that when executed by the at least one processor determines whether a custom VR environment relevant to the combined context is available with the replacement virtual object; and when the custom VR environment is available, the computer code that when executed by the at least one processor obtains the custom VR environment and substitutes the custom VR environment as the virtual environment.

20. The non-transitory computer readable medium of claim 19, further comprising computer code that when executed by the at least one processor selects and obtains at least one of the relevant virtual object and the custom VR environment from one of a plurality of VR provider servers, the one of the plurality of VR provider servers being selected based on a predetermined VR provider server prioritization.

* * * * *